(12) United States Patent
Yokoyama et al.

(10) Patent No.: US 12,409,391 B2
(45) Date of Patent: Sep. 9, 2025

(54) VIBRATION PRESENTATION APPARATUS

(71) Applicant: SONY GROUP CORPORATION, Tokyo (JP)

(72) Inventors: Ryo Yokoyama, Tokyo (JP); Osamu Ito, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 12 days.

(21) Appl. No.: 17/904,718

(22) PCT Filed: Feb. 16, 2021

(86) PCT No.: PCT/JP2021/005684
§ 371 (c)(1),
(2) Date: Aug. 21, 2022

(87) PCT Pub. No.: WO2021/172093
PCT Pub. Date: Sep. 2, 2021

(65) Prior Publication Data
US 2022/0410021 A1 Dec. 29, 2022

(30) Foreign Application Priority Data
Feb. 27, 2020 (JP) .................................. 2020-032073

(51) Int. Cl.
*A63G 31/04* (2006.01)
*A47C 1/12* (2006.01)

(52) U.S. Cl.
CPC ................ *A63G 31/04* (2013.01); *A47C 1/12* (2013.01)

(58) Field of Classification Search
CPC ...... A61H 2023/029; A61H 2023/0272; A61H 23/0254; A61H 23/0245; A61H 23/0236; A61H 23/0218; A61H 23/0006; A61H 23/07; A61H 23/002; A61H 23/004; A47C 7/72; A47C 1/12; G07F 17/08; A63G 31/04; E02D 3/074; E01C 19/38; B06B 1/166; B06B 1/164; B06B 1/161; B06B 1/16
(Continued)

(56) References Cited

U.S. PATENT DOCUMENTS

| | | | |
|---|---|---|---|
| 6,620,117 B1 * | 9/2003 | Johnson ................. | A61H 1/005 601/84 |
| 6,695,799 B2 * | 2/2004 | Kitadou ............... | A47C 21/006 601/91 |
| 11,628,106 B1 * | 4/2023 | Chitalu ................. | A61H 7/007 601/99 |

FOREIGN PATENT DOCUMENTS

| | | |
|---|---|---|
| JP | 05-023441 A | 2/1993 |
| JP | 08-098957 A | 4/1996 |

(Continued)

OTHER PUBLICATIONS

International Search Report and Written Opinion of PCT Application No. PCT/JP2021/005684, issued on Apr. 27, 2021, 11 pages of ISRWO.

*Primary Examiner* — T. Scott Fix
(74) *Attorney, Agent, or Firm* — CHIP LAW GROUP

(57) ABSTRACT

A vibration presentation apparatus according to the present technology includes a base portion, a first vibrating portion, and a second vibrating portion. A user can ride on the base portion. The first vibrating portion is provided to the base portion and has a first vibration characteristic. The second vibrating portion is provided to the base portion and has a second vibration characteristic different from the first vibration characteristic.

21 Claims, 13 Drawing Sheets

(58) Field of Classification Search
USPC ....... 297/217.3; 606/90, 91, 92, 93, 95, 107,
606/108, 111; 74/25, 87
See application file for complete search history.

(56) References Cited

FOREIGN PATENT DOCUMENTS

| | | | | |
|---|---|---|---|---|
| JP | 2000-089894 A | | 3/2000 | |
| JP | 2002-052247 A | | 2/2002 | |
| JP | 2007-268012 A | | 10/2007 | |
| JP | 2014-531278 A | | 11/2014 | |
| JP | 2018-029642 A | | 3/2018 | |
| KR | 1020110139613 A | * | 12/2011 | |
| KR | 10-2014-0105877 A | | 9/2014 | |
| WO | WO-9519744 A1 | * | 7/1995 | ............... A61H 1/00 |
| WO | WO-2005093160 A1 | * | 10/2005 | ............. E01C 19/38 |
| WO | WO-2019039692 A1 | * | 2/2019 | ............. A61F 7/007 |

\* cited by examiner

VIBRATION PRESENTATION APPARATUS

CROSS REFERENCE TO RELATED APPLICATIONS

This application is a U.S. National Phase of International Patent Application No. PCT/JP2021/005684 filed on Feb. 16, 2021, which claims priority benefit of Japanese Patent Application No. JP 2020-032073 filed in the Japan Patent Office on Feb. 27, 2020. Each of the above-referenced applications is hereby incorporated herein by reference in its entirety.

TECHNICAL FIELD

The present technology relates to a technique for a vibration presentation apparatus or the like that is capable of presenting vibration to a user when the user rides on the apparatus.

BACKGROUND ART

Patent Literature 1 below describes, for example, a motion chair installed in a movie theater or the like. In such a motion chair, when a user is watching a movie, a seat portion thereof vibrates in accordance with a video. In the motion chair, the intensity of vibration can be set stepwise in accordance with an input made by a user.

CITATION LIST

Patent Literature

Patent Literature 1: Japanese Patent Application Laid-open No. 2014-531278

DISCLOSURE OF INVENTION

Technical Problem

For example, in the field as described above, there is a need for a vibration presentation apparatus capable of providing various vibration experiences to users.

In view of the above circumstances, it is an object of the present technology to provide a vibration presentation apparatus capable of providing various vibration experiences to users.

Solution to Problem

A vibration presentation apparatus according to the present technology includes a base portion, a first vibrating portion, and a second vibrating portion.

A user can ride on the base portion.

The first vibrating portion is provided to the base portion and has a first vibration characteristic.

The second vibrating portion is provided to the base portion and has a second vibration characteristic different from the first vibration characteristic.

In this vibration presentation apparatus, the two types of vibrating portions having different vibration characteristics are provided to the base portion, so that various vibration experiences can be provided to the user.

In the vibration presentation apparatus, a first vibration direction of the first vibrating portion and a second vibration direction of the second vibrating portion may be different directions.

In the vibration presentation apparatus, the first vibration direction and the second vibration direction may be orthogonal to each other.

In the vibration presentation apparatus, the first vibration direction may be a direction vertical to the base portion, and the second vibration direction may be a direction horizontal to the base portion.

In the vibration presentation apparatus, the first vibrating portion may be disposed at a position corresponding to the center of gravity of the base portion, and the second vibrating portion may be disposed at a position deviating from the center of gravity of the base portion.

In the vibration presentation apparatus, the second vibration direction may be a direction non-parallel to a straight line connecting the center of gravity of the base portion and the second vibrating portion.

In the vibration presentation apparatus, the second vibration direction may be a direction orthogonal to the straight line connecting the center of gravity of the base portion and the second vibrating portion.

The vibration presentation apparatus may further include a third vibrating portion that has the second vibration characteristic, vibrates in the second vibration direction, and is disposed at a position on an opposite side of the center of gravity of the base portion from the second vibrating portion.

In the vibration presentation apparatus, the second vibrating portion and the third vibrating portion may be driven in opposite phases.

In the vibration presentation apparatus, the second vibration direction may be a direction parallel to a straight line connecting the center of gravity of the base portion and the second vibrating portion.

The vibration presentation apparatus may further include a third vibrating portion that has the second vibration characteristic, vibrates in the second vibration direction, and is disposed at a position on an opposite side of the center of gravity of the base portion from the second vibrating portion.

In the vibration presentation apparatus, the second vibrating portion and the third vibrating portion may be driven in the same phase.

In the vibration presentation apparatus, a first vibration direction of the first vibrating portion and a second vibration direction of the second vibrating portion may be the same direction.

In the vibration presentation apparatus, the first vibration direction and the second vibration direction may be directions vertical to the base portion.

In the vibration presentation apparatus, the first vibrating portion may be disposed at a position corresponding to the center of gravity of the base portion, and the second vibrating portion may be disposed at a position deviating from the center of gravity of the base portion.

The vibration presentation apparatus may further include a third vibrating portion that has the second vibration characteristic, vibrates in the second vibration direction, and is disposed at a position on an opposite side of the center of gravity of the base portion from the second vibrating portion.

In the vibration presentation apparatus, the second vibrating portion and the third vibrating portion may be driven in opposite phases.

In the vibration presentation apparatus, each of the first vibrating portion and the second vibrating portion may be disposed at a position corresponding to the center of gravity of the base portion.

In the vibration presentation apparatus, the second vibrating portion and the third vibrating portion may be driven in the same phase.

In the vibration presentation apparatus, the base portion may include at least one of a porous structure, a wire mesh structure, or an open-cell structure.

MODE(S) FOR CARRYING OUT THE INVENTION

Embodiments according to the present technology will be described below with reference to the drawings.

First Embodiment

<Overall Configuration and Configurations of Structural Elements>

Figure 1:
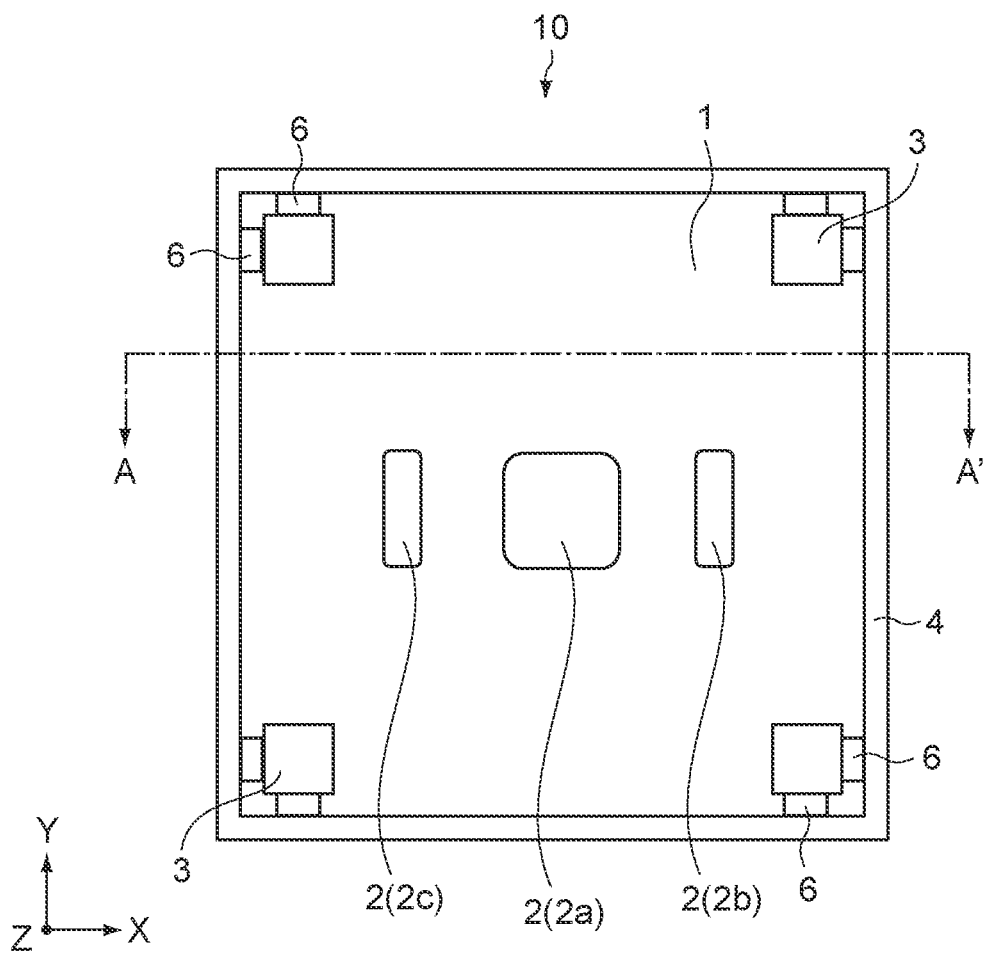
FIG. 1 is a view of a vibration presentation apparatus according to a first embodiment of the present technology as viewed from below.
Figure 2:
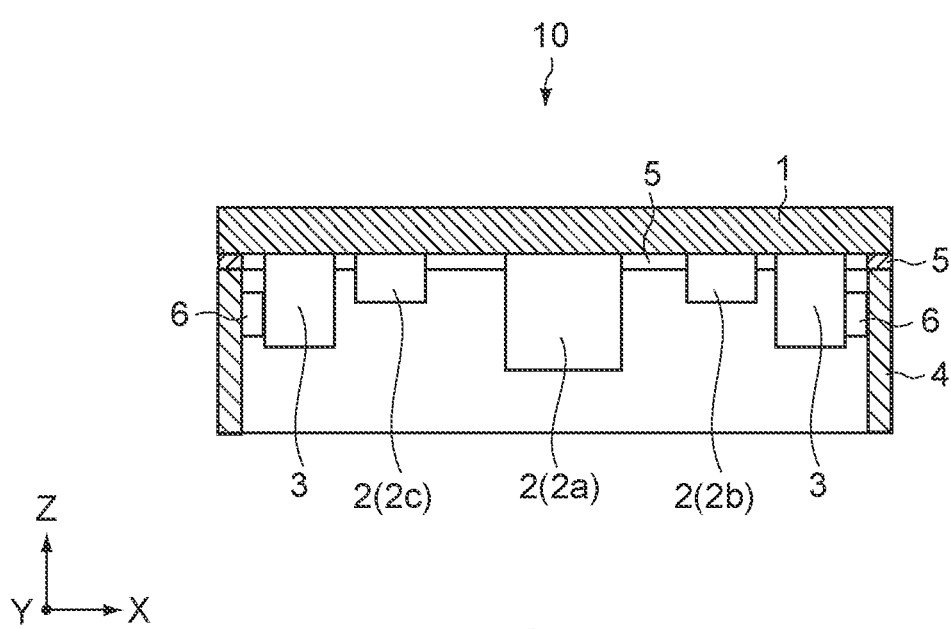
FIG. 2 is a cross-sectional view of the vibration presentation apparatus taken along A-A' shown in FIG. 1 as viewed from a lateral direction.

FIG. 1 is a view of a vibration presentation apparatus 10 according to a first embodiment of the present technology as viewed from below. FIG. 2 is a cross-sectional view of the vibration presentation apparatus 10 taken along A-A' shown in FIG. 1 as viewed from a lateral direction.

Figure 3:
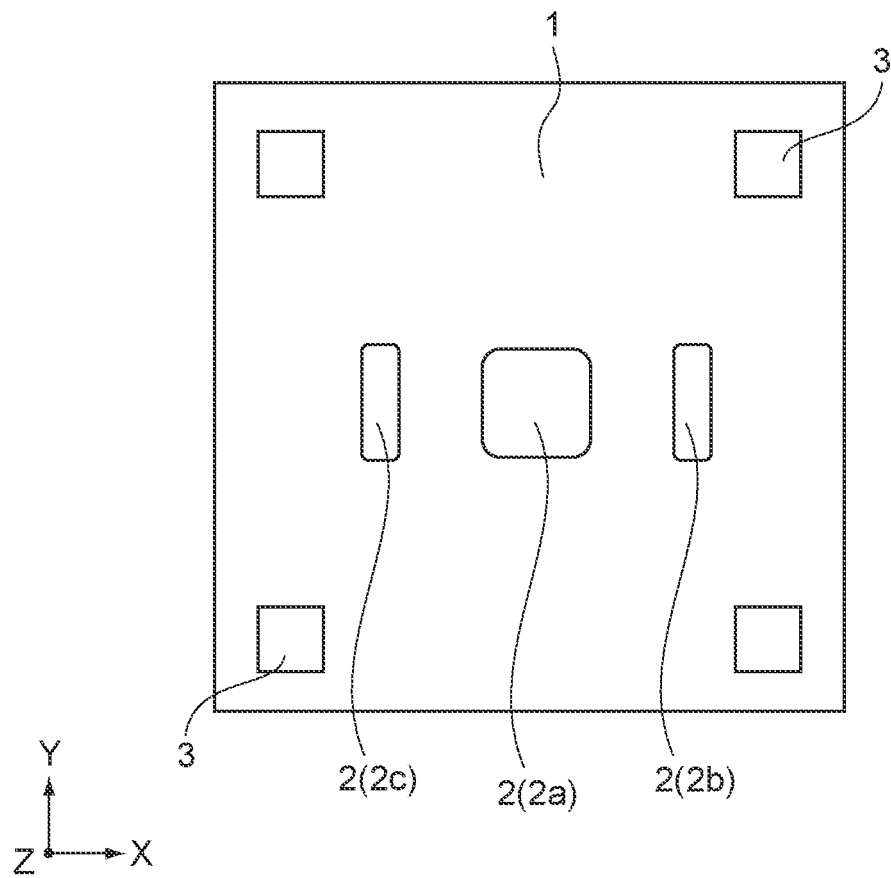
FIG. 3 is a view of a part of the vibration presentation apparatus as viewed from below.
Figure 4:
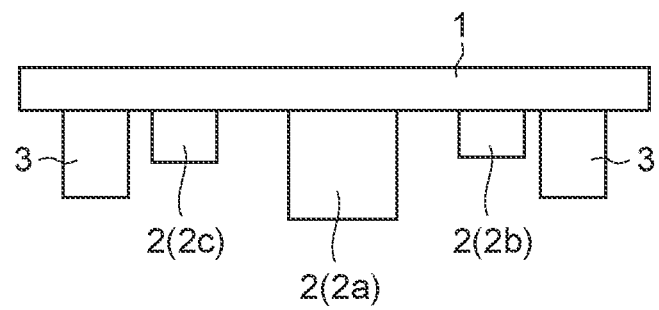
FIG. 4 is a view of a part of the vibration presentation apparatus as viewed from a lateral direction.
Figure 5:
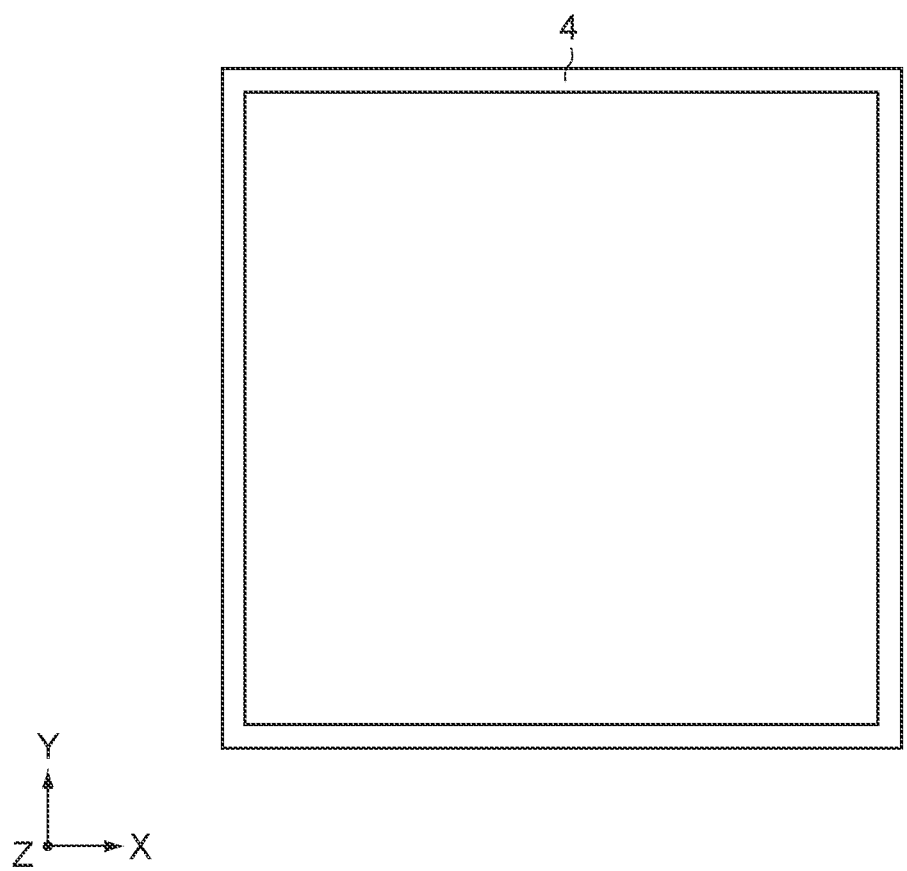
FIG. 5 is a view of a frame of the vibration presentation apparatus as viewed from below.
Figure 6:
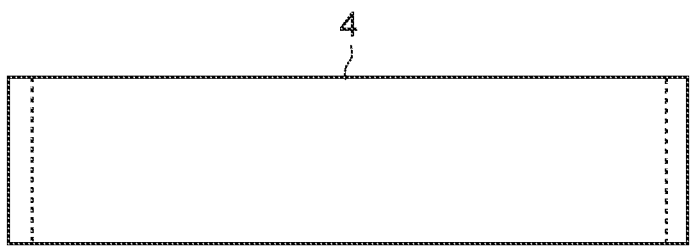
FIG. 6 is a view of the frame of the vibration presentation apparatus as viewed from a lateral direction.

FIG. 3 is a view of a part of the vibration presentation apparatus 10 as viewed from below. FIG. 4 is a view of a part of the vibration presentation apparatus 10 as viewed from a lateral direction. FIG. 5 is a view of a frame 4 of the vibration presentation apparatus 10 as viewed from below. FIG. 6 is a view of the frame 4 of the vibration presentation apparatus 10 as viewed from a lateral direction.

The vibration presentation apparatus 10 is installed and used in various places such as theme parks, amusement parks, game centers, and movie theaters. Further, the vibration presentation apparatus 10 is vibrated in accordance with various videos displayed by a projector, a television apparatus, an augmented reality (AR) or virtual reality (VR) apparatus, and the like, and sounds output together with the videos.

For example, the vibration presentation apparatus 10 is vibrated together with the video and sound of a blast. The vibration presentation apparatus 10 is vibrated in accordance with the video and sound, so that the vibration presentation apparatus 10 can give the sense of reality or immersion to the user.

The vibration presentation apparatus 10 may be an apparatus of the type that is used by the user standing on a base portion 1, or may be an apparatus of the type that is used by the user sitting on the base portion 1. In the case of the vibration presentation apparatus 10 of the type that is used by the user sitting thereon, the vibration presentation apparatus 10 may be configured in a chair shape.

As shown in FIGS. 1 to 6, the vibration presentation apparatus 10 includes the base portion 1, three vibrating portions 2 provided on the lower side of the base portion 1, four locking members 3 provided on the lower side of the base portion 1, and a frame 4 for supporting the base portion 1 from below.

Further, the vibration presentation apparatus 10 includes a first buffer portion 5 interposed between the base portion 1 and the frame 4, and eight second buffer portions 6 interposed between the frame 4 and the locking members 3. Note that a handrail or the like that can be gripped by the user may be provided on the upper side of the base portion 1.

In the following description, if the three vibrating portions 2 are distinguished from each other, they will be referred to as a first vibrating portion 2a, a second vibrating portion 2b, and a third vibrating portion 2c. On the other hand, if the three vibrating portions 2 are not particularly distinguished from each other, simply referred to as the vibrating portion(s) 2.

"Base Portion 1"

The base portion 1 is configured to allow a user to ride thereon. Here, the expression that the user "rides on" the base portion 1 includes that the user stands on the base portion 1 and the entire body of the user is located on the base portion 1, and also includes that the user sits on the base portion 1 and the entire body of the user or part thereof is located on the base portion 1. In other words, the meaning of "ride" includes the meaning of "sit".

The base portion 1 is configured in a plate shape and has a rectangular shape in plan view. The size of the base portion 1 may be, for example, a size that allows one user to ride thereon or a size that allows a plurality of users to ride thereon. The size of the base portion 1 can be appropriately changed in accordance with its use application.

The base portion 1 is made of, for example, various materials such as metal, resin, and wood. Note that the locking member 3 and the frame 4 are similarly made of various materials such as metal, resin, and wood.

In the example shown in the figures, the base portion 1 has a rectangular shape in plan view. The shape may be a polygon other than a rectangle, a circle, or the like. The shape of the base portion 1 is not particularly limited.

"Vibrating Portion 2"

The vibrating portion 2 includes the first vibrating portion 2a, the second vibrating portion 2b, and the third vibrating portion 2c. The first vibrating portion 2a is provided at a position corresponding to the center of gravity of the base portion 1 on the lower surface of the base portion 1. Meanwhile, the second vibrating portion 2b and the third vibrating portion 2c are provided at positions deviating from the center of gravity of the base portion 1 on the lower surface of the base portion 1. Specifically, the second vibrating portion 2b and the third vibrating portion 2c are provided at positions on the opposite sides of the center of gravity of the base portion 1.

The first vibrating portion 2a has a first vibration characteristic, and the second vibrating portion 2b and the third vibrating portion 2c have a second vibration characteristic different from the first vibration characteristic. In other words, the vibration characteristic of the first vibrating portion 2a and the vibration characteristics of the second vibrating portion 2b and the third vibrating portion 2c are different from each other, and the vibration characteristic of the second vibrating portion 2b and the vibration characteristic of the third vibrating portion 2c are the same.

Here, the vibration characteristic of the vibrating portion 2 means the characteristic of "frequency", "amplitude", or "intensity" of the vibration that can be output in the vibrating portion 2, and the different characteristics mean that the characteristics of "frequency", "amplitude", or "intensity" of the vibration that can be output in the vibrating portion 2 are different from each other.

In the description herein, the case where the frequency characteristics as the vibration characteristics are different will be described. Note that the term "frequency" that will be described hereinafter for the vibration characteristic of the vibrating portion 2 can be read as "amplitude" or "intensity".

In the first embodiment, the first vibrating portion 2a has a first frequency characteristic, and the second vibrating portion 2b and the third vibrating portion 2c have a second frequency characteristic different from the first frequency characteristic.

The first vibrating portion 2a has a relatively low frequency characteristic as the first frequency characteristic, and the second vibrating portion 2b and the third vibrating portion 2c have a relatively high frequency characteristic as the second frequency characteristic. As the first vibrating portion 2a, for example, an actuator having a frequency characteristic of a 10 Hz to 200 Hz (appropriately changeable) is used. As the second vibrating portion 2b and the third vibrating portion 2c, for example, an actuator having a frequency characteristic of 50 Hz to 500 Hz (appropriately changeable) is used.

Note that the high and low frequency characteristics may be reversed. In other words, the first vibrating portion 2a may have a relatively high frequency characteristic as the first frequency characteristic, and the second vibrating portion 2b and the third vibrating portion 2c may have a relatively low frequency characteristic as the second frequency characteristic.

Further, the first vibrating portion 2a is vibrated in a first vibration direction, and the second vibrating portion 2b and the third vibrating portion 2c are vibrated in a second vibration direction different from the first vibration direction. In other words, the vibration direction of the first vibrating portion 2a and the vibration direction of the second vibrating portion 2b and the third vibrating portion 2c are different from each other. Further, the vibration direction of the second vibrating portion 2b and the vibration direction of the third vibrating portion 2c are the same.

In the first embodiment, the first vibration direction and the second vibration direction are directions orthogonal to each other. Specifically, the first vibration direction of the first vibrating portion 2a is a vertical direction (Z-axis direction: a direction vertical to the upper surface and the lower surface of the base portion 1). Meanwhile, the second vibration direction in the second vibrating portion 2b and the third vibrating portion 2c is a horizontal direction (direction in the XY plane: a direction parallel to the upper surface and the lower surface of the base portion 1).

Figure 7:
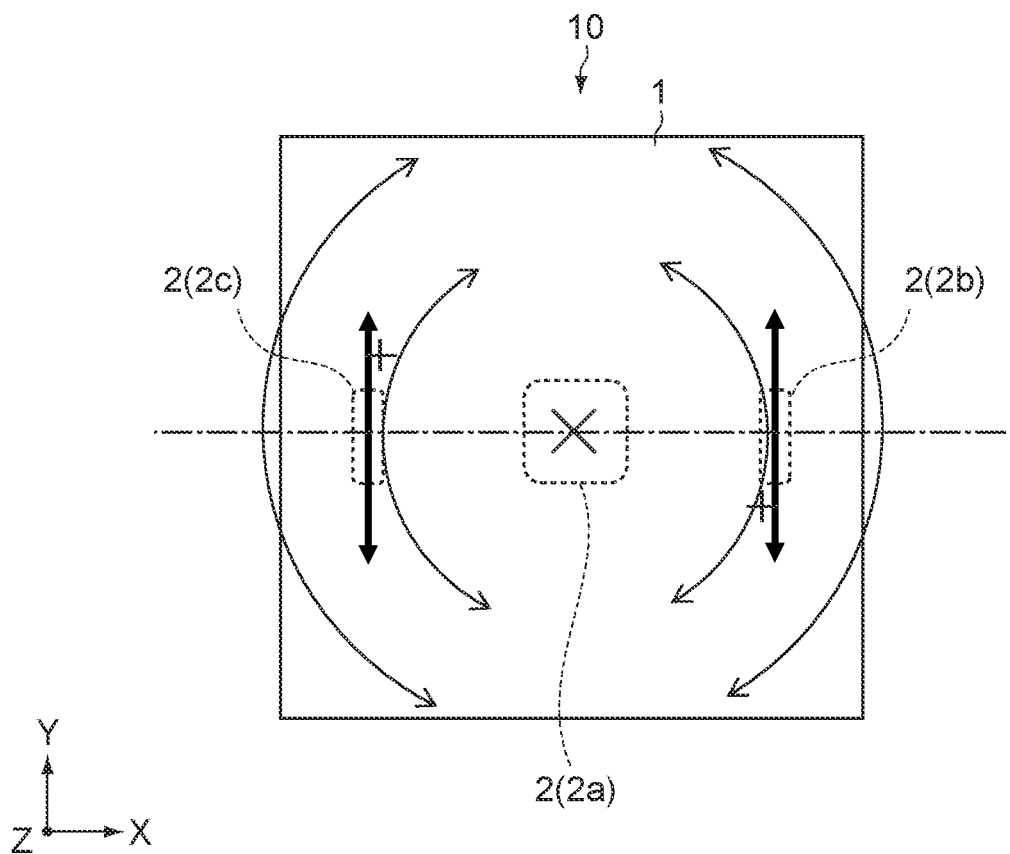
FIG. 7 is a diagram showing a second vibration direction in a second vibrating portion and a third vibrating portion.

FIG. 7 is a diagram showing the second vibration direction in the second vibrating portion 2b and the third vibrating portion 2c. As shown in FIG. 7, the second vibration direction in the second vibrating portion 2b and the third vibrating portion 2c is a direction in the horizontal plane. Further, the second vibration direction is a direction orthogonal to a straight line (see dashed line) connecting the center of gravity of the base portion 1 (see x mark), and the second vibrating portion 2b and the third vibrating portion 2c. Further, the second vibrating portion 2b and the third vibrating portion 2c are driven in opposite phases.

As shown in FIG. 7, the second vibrating portion 2b and the third vibrating portion 2c are driven in opposite phases, so that the second vibrating portion 2b and the third vibrating portion 2c can rotate the base portion 1 about the vertical axis (Z-axis).

The second vibrating portion 2b and the third vibrating portion 2c generate a rotational moment in the vertical direction (Z-axis direction) passing through the position of the center of gravity of the base portion 1 (see x mark of FIG. 7). The first vibrating portion 2a is disposed at the position corresponding to the rotational moment such that the vibration direction thereof coincides with the direction of the rotational moment.

Typically, the second vibrating portion 2b and the third vibrating portion 2c are simultaneously driven at the same timing. The first vibrating portion 2a may be driven at the same timing as the timing at which the second vibrating portion 2b and the third vibrating portion 2c are driven, or may be driven at a timing different from the timing at which the second vibrating portion 2b and the third vibrating portion 2c are driven.

"Locking Member 3"

The locking member 3 is formed in a quadrangular prism shape and is provided so as to extend in the vertical direction from the lower surface of the base portion 1. The locking member 3 is fixed, at a position corresponding to each of the four corners of the base portion 1, to a position slightly inside the corner portion.

Note that in the example shown in the figure the shape of the locking member 3 is a quadrangular prism shape, but this shape may be a cylindrical shape or a polygonal prism shape other than a square, and the shape of the locking member 3 is not particularly limited.

The locking member 3 is locked by the inner circumferential surface of the frame 4 and its horizontal movement is restricted. This prevents the base portion 1 from being laterally displaced from the frame 4. Note that in the first embodiment the base portion 1 is rotated about the vertical axis by the second vibrating portion 2b and the third vibrating portion 2c, and thus the base portion 1 is easily laterally displaced relative to the frame 4 relatively largely. Therefore, it is particularly effective to prevent lateral displacement using the locking member 3.

"Frame 4"

The frame 4 is formed in a rectangular frame shape in plan view and has a size similar to that of the base portion 1 in the horizontal direction. The frame 4 is disposed on the lower side of the base portion 1 and can support the base portion 1 from below. Further, the frame 4 surrounds the four locking members 3 in the circumferential direction and can restrict the horizontal movement of the four locking members 3 by its inner circumferential surface.

Note that in the example shown in the figures the shape of the frame 4 is rectangular in plan view, but this shape may be a circular shape or a polygon shape other than a square, and the shape of the frame 4 is not particularly limited.

"First Buffer Portion 5"

The first buffer portion 5 is provided between the lower surface of the base portion 1 (outer circumferential side) and the upper surface of the frame 4. The first buffer portion 5 is provided over the entire circumference of the upper surface of the frame 4. Note that the first buffer portion 5 may be provided so as to be scattered along the entire circumference of the upper surface of the frame 4.

The first buffer portion 5 is formed of a member having a constant elastic force, such as rubber or gel (e.g., alpha gel). Note that, likewise, a second buffer portion 6 is also formed of a member having a constant elastic force, such as rubber or gel.

The first buffer portion 5 can reduce the attenuation of vibration in the base portion 1. Further, the first buffer portion 5 is interposed between the base portion 1 and the frame 4, and thus the base portion 1 can be moved to some extent relative to the frame 4 (rotation about the Z-axis, or the like).

"Second Buffer Portion 6"

The second buffer portion 6 is provided between the outer circumferential surface of the locking member 3 and the inner circumferential surface of the frame 4. Specifically, the second buffer portions 6 are provided between the inner circumferential surface of the frame 4 and two surfaces of the locking member 3, the two surfaces facing the inner circumferential surface of the frame 4, among the four surfaces of the outer circumference of the locking member 3. Therefore, two second buffer portions 6 are provided for each of the four locking members 3, and a total of eight (=4×2) second buffer portions 6 are provided.

The second buffer portion 6 can prevent the locking member 3 from colliding with the frame 4 and from causing collision noise. Further, the second buffer portion 6 is interposed between the locking member 3 and the frame 4, and thus the base portion 1 can be moved to some extent relative to the frame 4 (rotation about the Z-axis, or the like).

"Control Apparatus"

The first vibrating portion 2a, the second vibrating portion 2b, and the third vibrating portion 2c are electrically connected to a control apparatus (not shown), and the drive thereof is controlled under the control of the control apparatus. The control apparatus may be an apparatus dedicated to the vibration presentation apparatus 10 or may be a general-purpose apparatus such as a personal computer (PC).

The control apparatus includes a control unit, a storage unit, and the like. The control unit is, for example, a central processing unit (CPU), which executes various calculations on the basis of various programs stored in the storage unit, and controls the drive of the first vibrating portion 2a, the second vibrating portion 2b, and the third vibrating portion 2c.

The storage unit includes a nonvolatile memory in which various programs and various types of data necessary for processing of the control unit are stored, and a volatile memory used as a work area of the control unit. Note that the various programs described above may be read from a portable recording medium such as an optical disc or a semiconductor memory, or may be downloaded from a server apparatus over a network.

<Rotation of Base Portion 1 about Vertical Axis>

In the first embodiment, the base portion 1 is rotated about the vertical axis by the second vibrating portion 2b and the third vibrating portion 2c to vibrate the base portion 1. Description will be given on the conditions that vibration occurs due to the rotation of the base portion 1 about the vertical axis.

Figure 8:
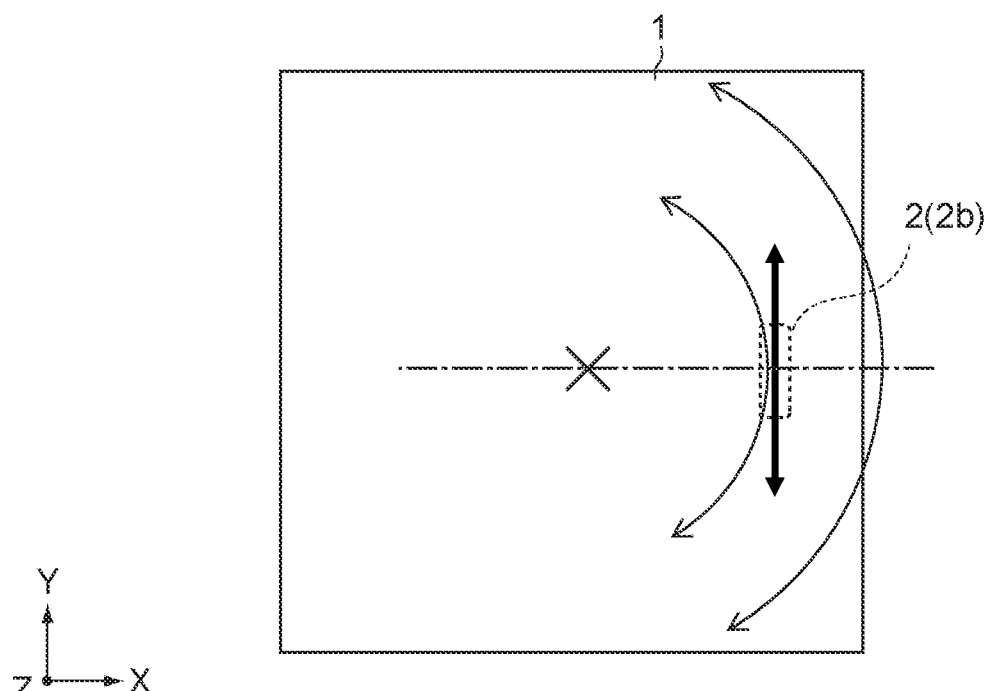
FIG. 8 is a diagram showing an example of a case where a base portion is rotated about the vertical axis only by the second vibrating portion to vibrate the base portion.

First, a case will be described in which the base portion 1 is vibrated by rotating the base portion 1 about the vertical axis only by the second vibrating portion 2b in the second vibrating portion 2b and the third vibrating portion 2c. FIG. 8 is a diagram showing an example of a case where the base portion 1 is vibrated by rotating the base portion 1 about the vertical axis only by the second vibrating portion 2b.

Condition 1: The second vibration direction of the second vibrating portion 2b includes a component of the horizontal direction (direction in the XY plane).

If the second vibration direction of the second vibrating portion 2b does not include a component of the horizontal direction, the base portion 1 does not rotate about the vertical axis (Z-axis). Note that in the first embodiment the second vibration direction of the second vibrating portion 2b includes only a horizontal component and does not include a vertical component.

Condition 2: The second vibrating portion 2b is disposed at a position deviating from the center of gravity of the base portion 1 (see x mark of FIG. 8).

Figure 9:
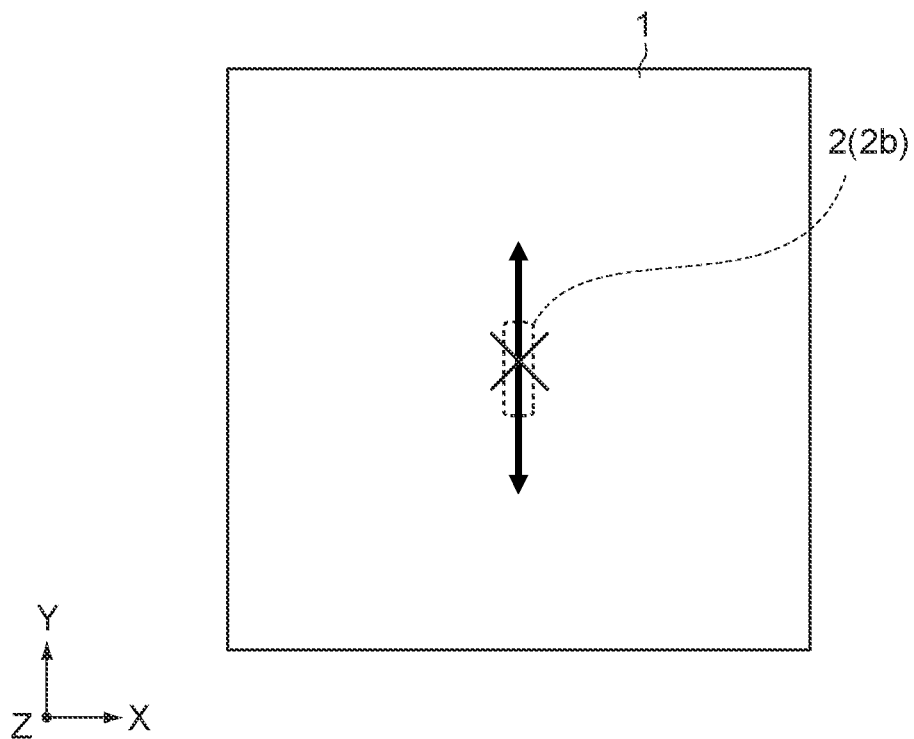
FIG. 9 is a diagram showing a state when the second vibrating portion is disposed at the center of gravity of the base portion 1.

Even if the second vibration direction of the second vibrating portion 2b includes a component of the horizontal direction, when the second vibrating portion 2b is disposed at the center of gravity of the base portion 1, the base portion 1 does not rotate about the vertical axis. FIG. 9 is a diagram showing a state when the second vibrating portion 2b is disposed at the center of gravity of the base portion 1. As shown in FIG. 9, when the second vibrating portion 2b is disposed at the center of gravity of the base portion 1, the base portion 1 vibrates parallel to the second vibration direction of the second vibrating portion 2b without rotating.

Condition 3: The second vibration direction of the second vibrating portion 2b is non-parallel to a straight line connecting the center of gravity of the base portion 1 and the second vibrating portion 2b (center of vibration) (see dashed line in FIG. 8).

Even if the condition 1 and the condition 2 are satisfied, when the vibration direction of the second vibrating portion 2b is parallel to the straight line connecting the center of gravity of the base portion 1 and the second vibrating portion 2b, the base portion 1 does not rotate about the vertical axis.

Figure 10:
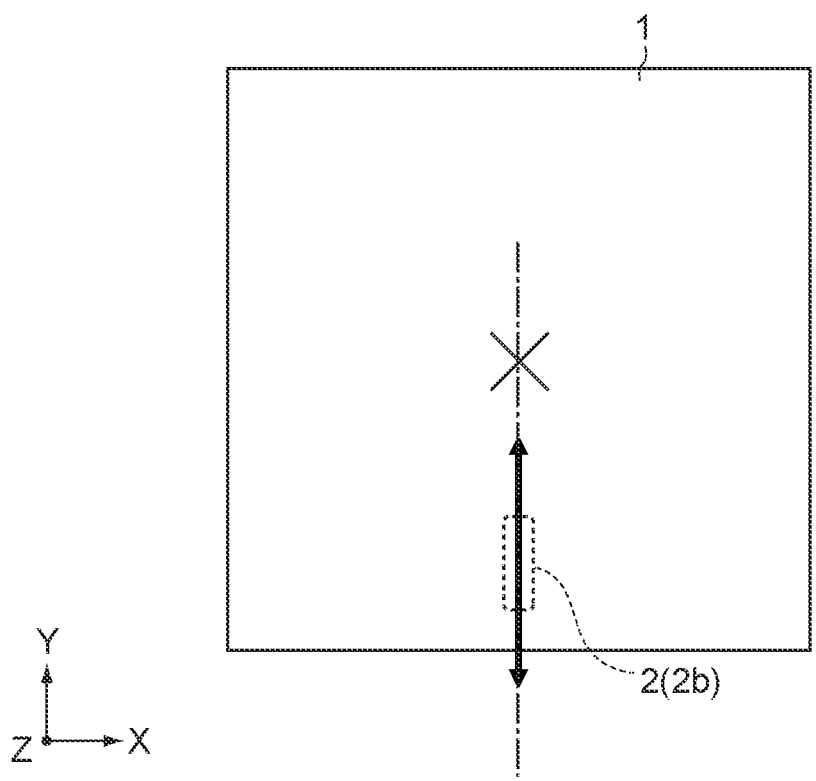
FIG. 10 is a diagram showing a state when the second vibration direction of the second vibrating portion is parallel to a straight line connecting the center of gravity of the base portion and the second vibrating portion.

FIG. 10 is a diagram showing a state when the second vibration direction of the second vibrating portion 2b is parallel to the straight line connecting the center of gravity of the base portion 1 and the second vibrating portion 2 (see dashed line). As shown in FIG. 10, when the second vibration direction of the second vibrating portion 2b is parallel to the straight line connecting the center of gravity of the base portion 1 and the second vibrating portion 2b (see dashed line), the base portion 1 vibrates parallel to the second vibration direction of the second vibrating portion 2b without rotating.

Note that, regarding the condition 3, if the second vibration direction of the second vibrating portion 2b is perpendicular to the straight line connecting the center of gravity of the base portion 1 and the second vibrating portion 2b (the center of vibration), the base portion 1 can be rotated most efficiently (see FIG. 8). Thus, in the first embodiment, the second vibration direction of the second vibrating portion 2b is perpendicular to the straight line connecting the center of gravity of the base portion 1 and the second vibrating portion 2b (see FIG. 7).

Next, a case will be described in which the third vibrating portion 2c is further added in the vibration presentation apparatus 10. Also for the third vibrating portion 2c, its position and vibration direction are set so as to satisfy the condition 1, the condition 2, and the condition 3.

The third vibrating portion 2c may be basically disposed in any way as long as its position and vibration direction are set so as to satisfy the condition 1, the condition 2, and the condition 3 (it is necessary to pay attention to the phases of the drive of the second vibrating portion 2b and the third vibration so as not to mutually cancel out the components of rotation by the second vibrating portion 2b and the third vibrating portion 2c).

On the other hand, in the first embodiment, the position and the vibration direction of the vibrating portion 2 are set such that the third vibrating portion 2c can most efficiently rotate the base portion 1 about the vertical axis together with the second vibrating portion 2b to vibrate the base portion 1.

In other words, referring to FIG. 7, in order to most efficiently rotate the base portion 1 about the vertical axis, in the first embodiment, the third vibrating portion 2c is disposed at a position on the opposite side of the center of gravity of the base portion 1 from the second vibrating portion 2b. Further, in order to most efficiently rotate the base portion 1 about the vertical axis, in the first embodiment, the vibration direction of the third vibrating portion 2c is set to the same direction as the second vibration direction of the second vibrating portion 2b, and the vibration direction of the third vibrating portion 2c is perpendicular to the straight line connecting the center of gravity of the base portion 1 and the third vibrating portion 2c (the center of vibration).

Further, in this case, when the second vibrating portion 2b and the third vibrating portion 2c are driven in the same phase, the components of rotation by the second vibrating portion 2b and the third vibrating portion 2c are mutually canceled out. Thus, in the first embodiment, the second vibrating portion 2b and the third vibrating portion 2c are driven in the opposite phases. Note that when the second vibrating portion 2b and the third vibrating portion 2c are driven in the same phase, the base portion 1 vibrates parallel to the second vibration direction of the second vibrating portion 2b and the third vibrating portion 2c without rotating.

Note that various conditions described here are conditions for rotating the base portion 1 about the vertical axis. Therefore, it is not intended that the position, the vibration direction, and the phase of the vibrating portion 2 should be set without deviating from the various conditions in the present technology.

For example, as shown in FIG. 9, the second vibrating portion 2b may be disposed at a position corresponding to the center of gravity of the base portion 1 (e.g., the second vibrating portion 2b is disposed either above or below the first vibrating portion 2a). Further, as shown in FIG. 10, the vibration direction of the second vibrating portion 2b may be set so as to be parallel to the straight line connecting the center of gravity of the base portion 1 and the second vibrating portion 2b. Further, in FIG. 7, the second vibrating portion 2b and the third vibrating portion 2c may be driven in the same phase.

Effects and Others

In the vibration presentation apparatus 10 according to the first embodiment, since two types of vibrating portions 2 (first vibrating portion 2a, and second vibrating portion 2b and third vibrating portion 2c) having different frequency characteristics are used, various vibration experiences can be provided to the user. In other words, in the first embodiment, the vibration in a wide band, which cannot be reproduced in a case where a single vibrating portion 2 is used or in a case where a plurality of vibrating portions 2 is used but the frequency characteristics of those vibrating portions 2 are the same, can be presented to the user.

Further, in the vibration presentation apparatus 10 according to the first embodiment, the first vibration direction by the first vibrating portion 2a and the second vibration direction by the second vibrating portion 2b and the third vibrating portion 2c are different directions. In particular, the first vibration direction and the second vibration direction are directions orthogonal to each other. This allows the vibration in the two orthogonal directions to be presented to the user.

Further, in the vibration presentation apparatus 10 according to the first embodiment, the first vibration direction by the first vibrating portion 2a is the vertical direction, and the second vibration direction by the second vibrating portion 2b and the third vibrating portion 2c is the direction in the horizontal plane. This makes it possible to present vibration in two directions of the vertical and horizontal directions.

Further, in the first embodiment, since the first vibrating portion 2a is disposed at a position corresponding to the center of gravity of the base portion 1, it is possible to efficiently vibrate the base portion 1 in the vertical direction by the first vibrating portion 2a.

Further, in the first embodiment, the second vibrating portion 2b is disposed at a position deviating from the center of gravity of the base portion 1, and the second vibration direction of the second vibrating portion 2b is non-parallel to the straight line connecting the center of gravity of the base portion 1 and the second vibrating portion 2b. This makes it possible to vibrate the base portion 1 by rotating the base portion 1 about the vertical axis by the second vibrating portion 2b.

Further, in the first embodiment, the second vibration direction of the second vibrating portion 2b is a direction orthogonal to the straight line connecting the center of gravity of the base portion 1 and the second vibrating portion 2b. This makes it possible to efficiently rotate the base portion 1 about the vertical axis by the second vibrating portion 2b.

Further, in the first embodiment, the third vibrating portion 2c is disposed at a position on the opposite side of the center of gravity of the base portion 1 from the second vibrating portion 2b. In addition, the vibration direction by the third vibrating portion 2c is the same direction as the second vibration direction of the second vibrating portion 2b. Further, the third vibrating portion 2c is driven in the phase opposite to the second vibrating portion 2b. Thus, the third vibrating portion 2c can vibrate the base portion 1 by efficiently rotating the base portion 1 about the vertical axis together with the second vibrating portion 2b.

Figure 11:
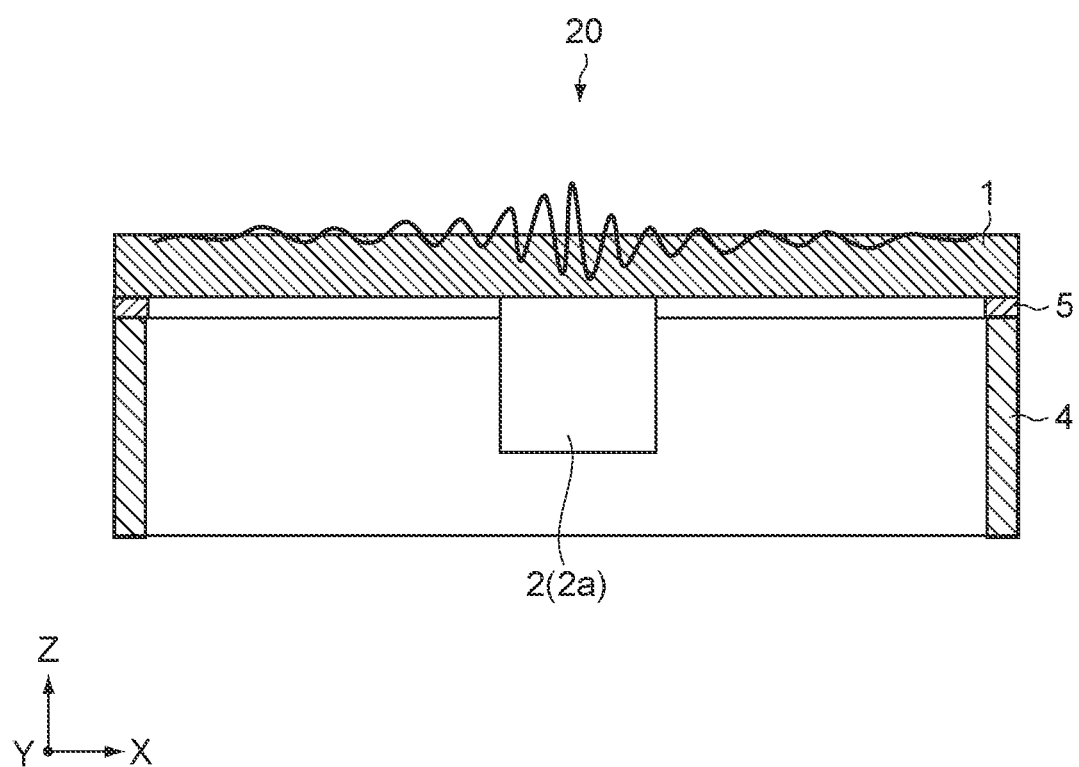
FIG. 11 is a view showing a vibration presentation apparatus according to a comparative example and showing an example of a case where vibration unevenness occurs.

Note that the first embodiment provides an advantage that vibration unevenness can be reduced. FIG. 11 is a diagram showing a vibration presentation apparatus 20 according to a comparative example, and is a diagram showing an example of a case where vibration unevenness occurs. The vibration presentation apparatus 20 according to the comparative example differs from the vibration presentation apparatus 10 according to the first embodiment in that the vibration presentation apparatus 20 does not include the second vibrating portion 2b, the third vibrating portion 2c, the locking members 3, and the second buffer portions 6.

As shown in FIG. 11, in the vibration presentation apparatus 20 according to the comparative example, when the first vibrating portion 2a vibrates, the outer circumferential portion of the base portion 1 becomes a node of vibration, so that vibration is large in the vicinity of the center of the base portion 1 and vibration is reduced at the position near the outer circumference of the base portion 1. If there are a user riding in the vicinity of the center of the base portion 1 and a user riding at a position near the outer circumference of the base portion 1, the magnitude of the vibration presented to each user varies.

On the other hand, in the vibration presentation apparatus 10 according to the first embodiment, the base portion 1 can be rotated about the vertical axis to vibrate the base portion 1 by the second vibrating portion 2b and the third vibrating portion 2c (see FIG. 7). Therefore, in the vibration presentation apparatus 10 according to the first embodiment, the base portion 1 can be uniformly vibrated even at a position near the outer circumference by the second vibrating portion 2b and the third vibrating portion 2c.

In other words, if the first vibrating portion 2a, the second vibrating portion 2b, and the third vibrating portion 2c are simultaneously driven, the first vibrating portion 2a vibrates the vicinity of the center of the base portion 1, and the second vibrating portion 2b and the third vibrating portion 2c vibrate the outer circumferential portion of the base portion 1, so that the vibration is made uniform throughout the base portion 1. In this case, if there are a user riding in the vicinity of the center of the base portion 1 and a user riding at the position near the outer circumference of the base portion 1, the magnitude of the vibration presented to each user can be made uniform.

Second Embodiment

Next, a second embodiment of the present technology will be described. In the description of the second embodiment and the subsequent embodiments, portions having the configurations and functions similar to those of the first embodiment described above will be denoted by the same reference numerals, and description thereof will be omitted or simplified.

Figure 12:
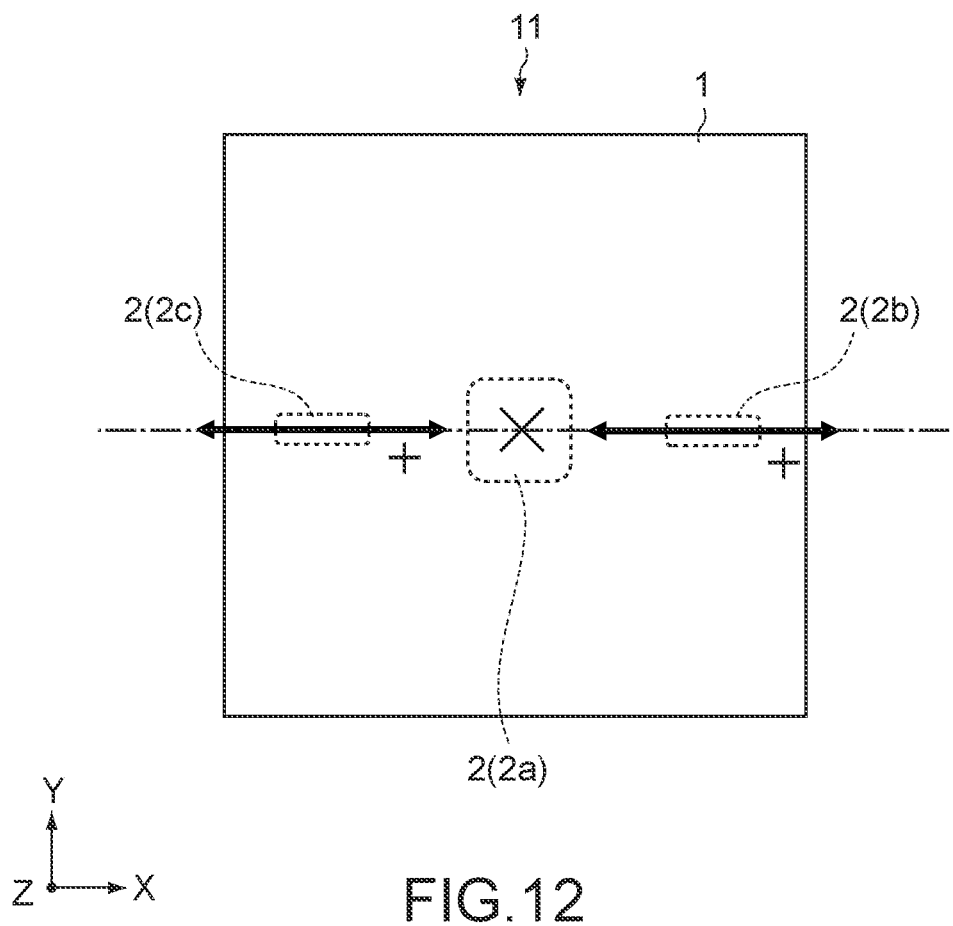
FIG. 12 is a view of a vibration presentation apparatus according to a second embodiment as viewed from above.

FIG. 12 is a view of a vibration presentation apparatus 11 according to the second embodiment as viewed from above. Note that, in FIG. 12, the illustration of the portions other than the base portion 1, the first vibrating portion 2a, the second vibrating portion 2b, and the third vibrating portion 2c is omitted. Note that, similarly in FIG. 13 to FIG. 16, which will be described later, the illustration of the portions other than the above portions is omitted.

Also in the second embodiment, similarly to the first embodiment, the first vibrating portion 2a is disposed at the center of gravity of the base portion 1, and the second vibrating portion 2b and the third vibrating portion 2c are disposed at positions deviating from the center of gravity of the base portion 1 and at positions on the opposite sides of the center of gravity of the base portion 1. Further, also in the second embodiment, similarly to the first embodiment, the first vibration direction of the first vibrating portion 2a is the vertical direction, and the second vibration direction of the second vibrating portion 2b and the third vibrating portion 2c is the direction in the horizontal plane.

On the other hand, in the first embodiment, the second vibration direction in the second vibrating portion 2b and the third vibrating portion 2c is a non-parallel (perpendicular) direction with respect to the straight line connecting the center of gravity of the base portion 1 with the second vibrating portion 2b and the third vibrating portion 2c (the center of vibration) (see FIG. 7).

In contrast, in the second embodiment, as shown in FIG. 12, the second vibration direction in the second vibrating portion 2b and the third vibrating portion 2c is a direction parallel to the straight line connecting the center of gravity of the base portion 1 with the second vibrating portion 2b and the third vibrating portion 2c (the center of vibration).

Further, in the first embodiment described above, the second vibrating portion 2b and the third vibrating portion 2c are driven in the opposite phases. On the other hand, in the second embodiment, if the second vibrating portion 2b and the third vibrating portion 2c are driven in the opposite phases, the vibration by the second vibrating portion 2b and the vibration by the third vibrating portion 2c are mutually canceled out, so that the second vibrating portion 2b and the third vibrating portion 2c are driven in the same phase.

In the second embodiment, the second vibrating portion 2b is disposed at a position deviating from the center of gravity of the base portion 1, and the second vibration direction of the second vibrating portion 2b is a direction parallel to the straight line connecting the center of gravity of the base portion 1 and the second vibrating portion 2b. Therefore, the base portion 1 can be efficiently vibrated in the second vibration direction by the second vibrating portion 2b.

Further, in the second embodiment, the third vibrating portion 2c is disposed at a position on the opposite side of the center of gravity of the base portion 1 from the second vibrating portion 2b, and the vibration direction by the third vibrating portion 2c is the same direction as the second vibration direction of the second vibrating portion 2b. Further, the third vibrating portion 2c is driven in the same phase as that of the second vibrating portion 2b. Thus, the third vibrating portion 2c can efficiently vibrate the base portion 1 in the second vibration direction together with the second vibrating portion 2b.

Further, in the second embodiment, it is possible to reduce vibration unevenness regarding the vibration of the base portion 1 in the second vibration direction by the second vibrating portion 2b and the third vibrating portion 2c. In other words, in the second embodiment, when the second vibrating portion 2b and the third vibrating portion 2c are driven, the entire base portion 1 uniformly vibrates in the second vibration direction, so that vibration unevenness is reduced.

Third Embodiment

Figure 13:
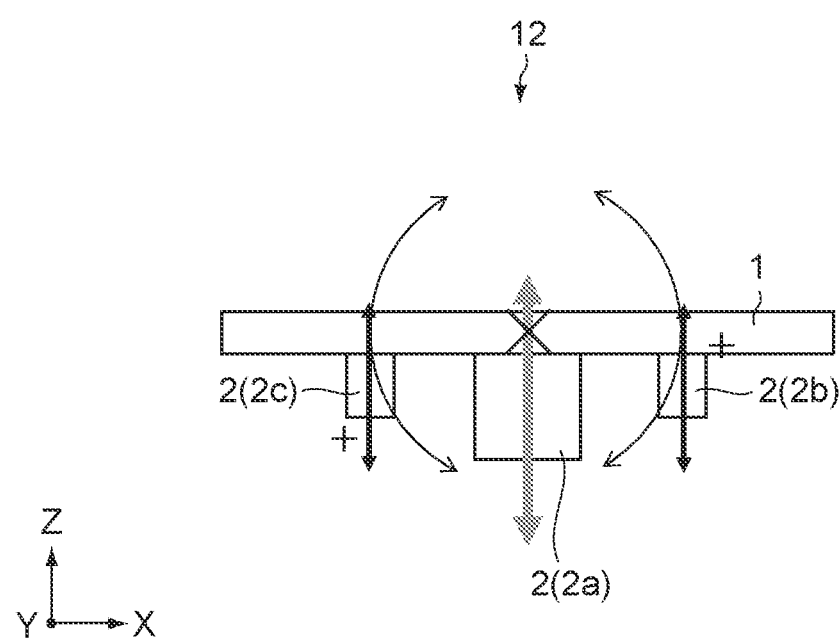
FIG. 13 is a view of a vibration presentation apparatus according to a third embodiment as viewed from a lateral direction.

Next, a third embodiment of the present technology will be described. FIG. 13 is a view of a vibration presentation apparatus 12 according to the third embodiment as viewed from a lateral direction.

Also in the third embodiment, similarly to the embodiments described above, the first vibrating portion 2a is disposed at the center of gravity of the base portion 1, and the second vibrating portion 2b and the third vibrating portion 2c are disposed at positions deviating from the base portion 1 and at positions on the opposite sides of the center of gravity of the base portion 1. Further, also in the third embodiment, similarly to the embodiments described above, the first vibration direction of the first vibrating portion 2a is the vertical direction.

On the other hand, in each of the embodiments described above, the second vibration direction in the second vibrating portion 2b and the third vibrating portion 2c is the direction in the horizontal plane. In contrast, in the third embodiment, as shown in FIG. 13, the second vibration direction in the second vibrating portion 2b and the third vibrating portion 2c is a vertical direction (the same direction as the first vibration direction).

Further, the second vibrating portion 2b and the third vibrating portion 2c are driven in the phases opposite to each other. By the drive of the second vibrating portion 2b and the third vibrating portion 2c in the phases opposite to each other, the second vibrating portion 2b and the third vibrating portion 2c can rotate the base portion 1 about the horizontal axis (in this example, Y-axis).

The second vibrating portion 2b and the third vibrating portion 2c generate a rotational moment in the horizontal direction (Y-axis direction) passing through the position of the center of gravity of the base portion 1 (see x mark). The first vibrating portion 2a is disposed at a position corresponding to the rotational moment such that its vibration direction is vertical to the direction of the rotational moment.

In the third embodiment, the base portion 1 is rotated about the horizontal axis by the second vibrating portion 2b and the third vibrating portion 2c to vibrate the base portion 1. Description will be given on the conditions that vibration occurs due to the rotation of the base portion 1 about the horizontal axis.

First, a case will be described in which the base portion 1 is vibrated by rotating the base portion 1 about the horizontal axis only by the second vibrating portion 2b in the second vibrating portion 2b and the third vibrating portion 2c.

Condition 1: The second vibration direction of the second vibrating portion 2b includes a component of the vertical direction (direction in the plane).

If the second vibration direction of the second vibrating portion 2b does not include a component of the vertical direction, the base portion 1 does not rotate about the horizontal axis. Note that in the third embodiment the second vibration direction of the second vibrating portion 2b includes only a vertical component and does not include a horizontal component.

Condition 2: The second vibrating portion 2b is disposed at a position deviating from the center of gravity of the base portion 1 (see x mark).

Even if the second vibration direction of the second vibrating portion 2b includes a component of the vertical direction, when the second vibrating portion 2b is disposed at the center of gravity of the base portion 1, the base portion 1 does not rotate about the horizontal axis.

If the second vibrating portion 2b satisfies the conditions 1 and 2, the base portion 1 can be vibrated by rotating the base portion 1 about the horizontal axis only by the second vibrating portion 2b. Note that if the base portion 1 is rotated about the vertical axis as in the first embodiment, the third condition is present, but if the base portion 1 is rotated about the horizontal axis as in the third embodiment, the third condition is not present.

Next, a case will be described in which the third vibrating portion 2c is further added in the vibration presentation apparatus 12. Also for the third vibrating portion 2c, its position and vibration direction are set so as to satisfy the condition 1 and the condition 2.

The third vibrating portion 2c may be basically disposed in any way as long as its position and vibration direction are set so as to satisfy the conditions 1 and 2 (it is necessary to pay attention to the phases of the drive of the second vibrating portion 2b and the third vibration so as not to mutually cancel out the components of rotation by the second vibrating portion 2b and the third vibrating portion 2c).

On the other hand, in the third embodiment, the position and the vibration direction of the third vibrating portion 2c are set such that the third vibrating portion 2c can most efficiently rotate the base portion 1 about the horizontal axis together with the second vibrating portion 2b to vibrate the base portion 1.

In other words, referring to FIG. 13, in order to most efficiently rotate the base portion 1 about the horizontal axis, in the third embodiment, the third vibrating portion 2c is disposed at a position on the opposite side of the center of gravity of the base portion 1 from the second vibrating portion 2b. Further, in order to most efficiently rotate the base portion 1 about the horizontal axis, in the third embodiment, the vibration direction of the third vibrating portion 2c is set to the same direction as the second vibration direction of the second vibrating portion 2b.

Further, in this case, when the second vibrating portion 2b and the third vibrating portion 2c are driven in the same phase, the components of rotation by the second vibrating portion 2b and the third vibrating portion 2c are mutually canceled out. Thus, in the third embodiment, the second vibrating portion 2b and the third vibrating portion 2c are driven in the opposite phases. Note that when the second vibrating portion 2b and the third vibrating portion 2c are driven in the same phase, the base portion 1 vibrates in the vertical direction without rotating.

Note that various conditions described here are conditions for rotating the base portion 1 about the horizontal axis. Therefore, it is not intended that the position, the vibration direction, and the phase of the vibrating portion 2 should be set without deviating from the various conditions in the present technology. For example, in FIG. 13, the second vibrating portion 2b and the third vibrating portion 2c may be driven in the same phase.

In the third embodiment, the second vibrating portion 2b is disposed at a position deviating from the center of gravity of the base portion 1, and the second vibration direction of the second vibrating portion 2b is the vertical direction. Therefore, it is possible to vibrate the base portion 1 by efficiently rotating the base portion 1 about the horizontal axis by the second vibrating portion 2b.

Further, in the third embodiment, the third vibrating portion 2c is disposed at a position on the opposite side of the center of gravity of the base portion 1 from the second vibrating portion 2b, and the vibration direction by the third vibrating portion 2c is the same direction as the second vibration direction of the second vibrating portion 2b. Further, the third vibrating portion 2c is driven in the phase opposite to the second vibrating portion 2b. Thus, the third vibrating portion 2c can vibrate the base portion 1 by efficiently rotating the base portion 1 about the horizontal axis together with the second vibrating portion 2b.

Further, also in the third embodiment, it is possible to reduce the vibration unevenness in the base portion 1. In other words, if the first vibrating portion 2a, the second vibrating portion 2b, and the third vibrating portion 2c are simultaneously driven, the first vibrating portion 2a vibrates the vicinity of the center of the base portion 1, and the second vibrating portion 2b and the third vibrating portion 2c vibrate the outer circumferential portion of the base portion 1, so that the vibration is made uniform throughout the base portion 1.

Fourth Embodiment

Figure 14:
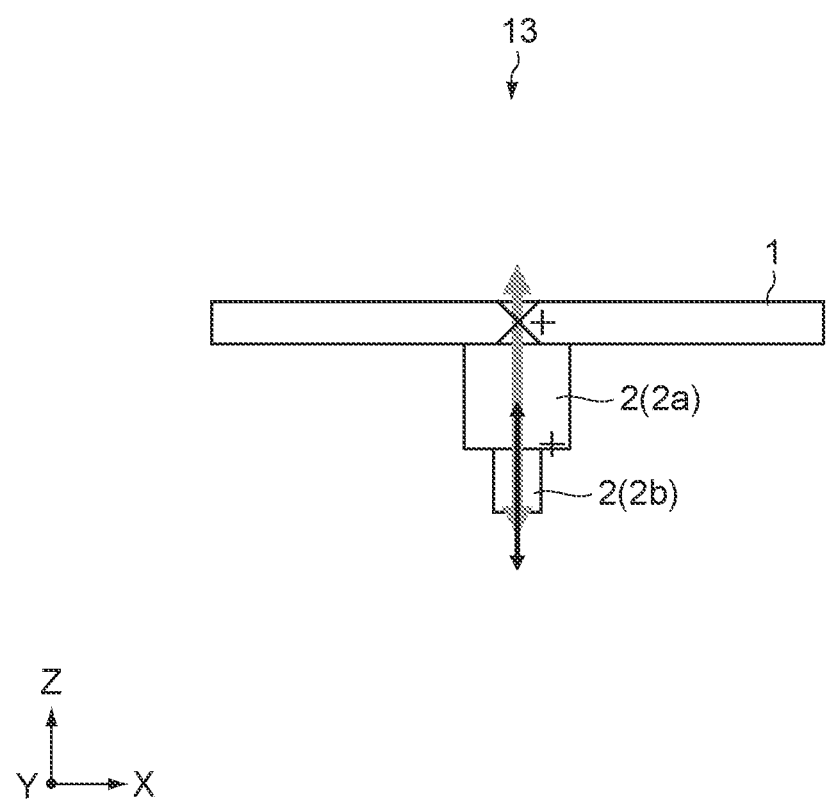
FIG. 14 is a view of a vibration presentation apparatus according to a fourth embodiment as viewed from a lateral direction.

Next, a fourth embodiment of the present technology will be described. FIG. 14 is a view of a vibration presentation apparatus 13 according to the fourth embodiment as viewed from a lateral direction.

Also in the fourth embodiment, similarly to the embodiments described above, the first vibrating portion 2a is disposed to correspond to the center of gravity of the base portion 1, and the first vibration direction of the first vibrating portion 2a is the vertical direction.

On the other hand, in each of the embodiments described above, the second vibrating portion 2b is disposed at a position deviating from the center of gravity of the base portion 1, but in the fourth embodiment, the second vibrating portion 2b is disposed on the lower side of the first vibrating portion 2a at a position corresponding to the center of gravity of the base portion 1. Note that the second vibration direction in the second vibrating portion 2b is the vertical direction (the same direction as the first vibration direction).

Further, in the fourth embodiment, the third vibrating portion 2c is not provided unlike the embodiments described above.

The first vibrating portion 2a and the second vibrating portion 2b may be driven simultaneously at the same timing or individually at different timings.

If the first vibrating portion 2a and the second vibrating portion 2b are driven simultaneously at the same timing and if the first vibrating portion 2a and the second vibrating portion 2b are driven in the opposite phases, the vibrations caused by the first vibrating portion 2a and the second vibrating portion 2b are mutually canceled out. Therefore, in this case, the first vibrating portion 2a and the second vibrating portion 2b are driven in the same phase.

In addition to the first vibrating portion 2a and the second vibrating portion 2b in the fourth embodiment, the second vibrating portion 2b, the third vibrating portion 2c, and the like described in each of the embodiments described above may be further provided.

Fifth Embodiment

In a fifth embodiment, description will be given on the structure for reducing noise due to vibration of the base portion 1.

Since the base portion 1 is constituted to have a relatively large area such that the user can ride (sit) thereon, a relatively large sound may occur when the base portion 1 is vibrated (especially in the vertical direction). If the base portion 1 is strongly vibrated, such a sound becomes larger accordingly and may become a problem as noise. In the fifth embodiment, the structure for reducing such noise will be described.

Figure 15:
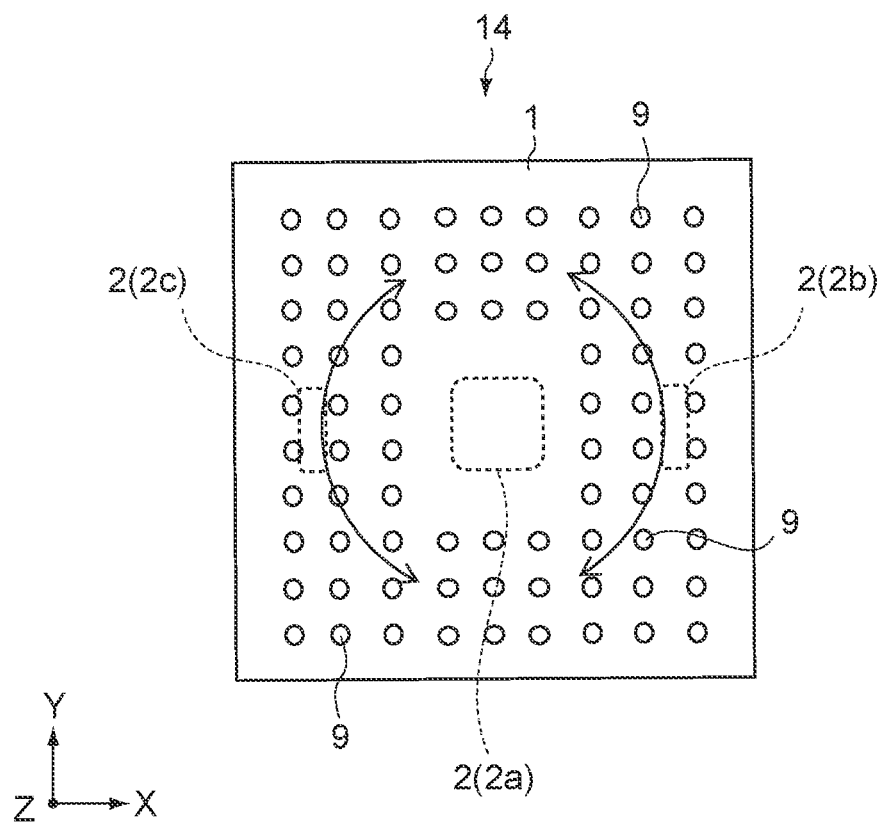
FIG. 15 is a view of a base portion of a vibration presentation apparatus according to a fifth embodiment as viewed from above.
Figure 16:
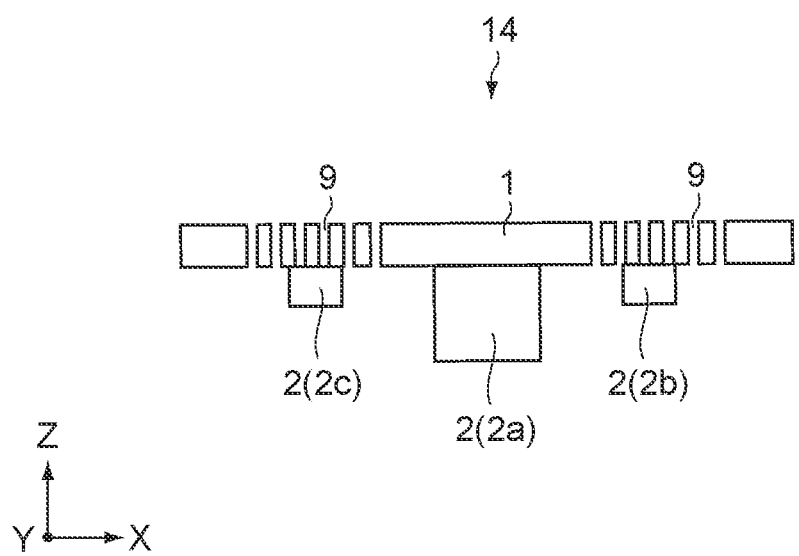
FIG. 16 is a view of the base portion of the vibration presentation apparatus according to the fifth embodiment as viewed from a lateral direction.

FIG. 15 is a view of a base portion 1 of a vibration presentation apparatus 14 according to the fifth embodiment as viewed from above. FIG. 16 is a view of the base portion 1 of the vibration presentation apparatus 14 according to the fifth embodiment as viewed from a lateral direction.

In the vibration presentation apparatus 14 according to the fifth embodiment, a plurality of holes 9 penetrating in the up-and-down direction is provided in the base portion 1, and the base portion 1 has a porous structure. Typically, the plurality of holes 9 is provided at least in a peripheral region excluding a region near the center of the base portion 1 in the horizontal direction. Note that the plurality of holes 9 may also be provided in a region near the center of the base portion 1 in the horizontal direction.

Further, in the examples shown in FIGS. 15 and 16, the configurations of the first vibrating portion 2a, the second vibrating portion 2b, and the third vibrating portion 2c are the same as those of the first embodiment. On the other hand, the configurations of the first vibrating portion 2a, the second vibrating portion 2b, and the third vibrating portion 2c may be any of the configurations described in the respective embodiments described above.

Figure 17:
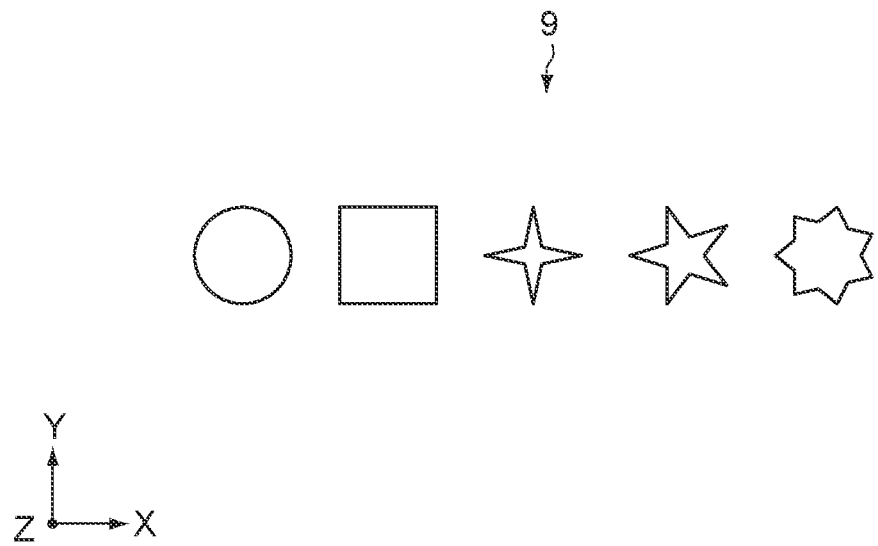
FIG. 17 is a diagram showing each example of the shape of a hole.

Further, although the shape of the hole 9 is circular in plan view in the examples shown in FIGS. 15 and 16, the shape of the hole 9 in plan view is not limited to circular and may be any shape. FIG. 17 is a diagram showing examples of the shape of the hole 9. FIG. 17 shows examples of the shape of the hole 9, such as a circle, a rectangle, a cross, a star shape of a pentagram, and a star shape of a heptagram, sequentially from the left.

Figure 18:
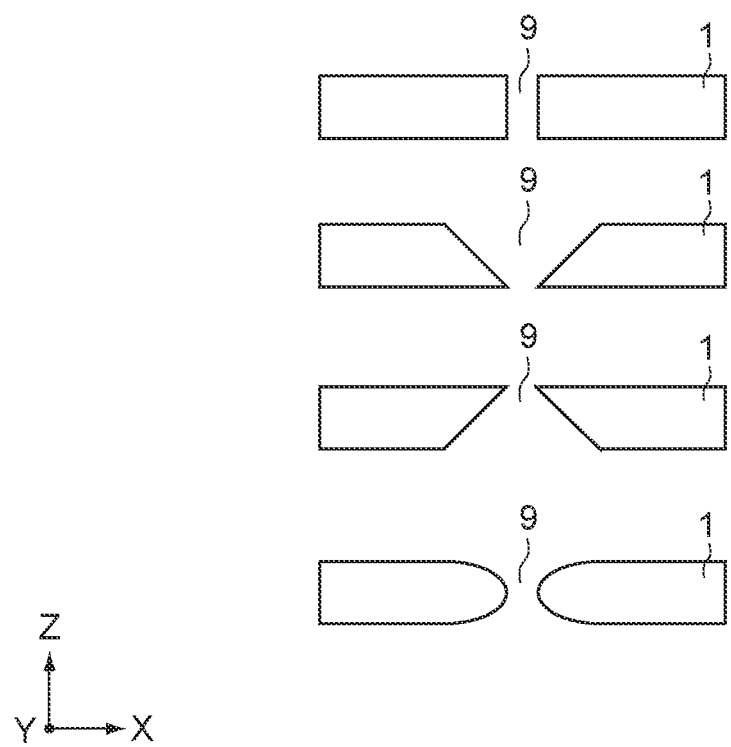
FIG. 18 is a diagram showing each example of the shape of the hole in the up-and-down direction.

Further, FIGS. 15 and 16 show the examples of the case where the hole 9 is provided parallel to the up-and-down direction, but the shape of the hole 9 in the up-and-down direction is not limited thereto. FIG. 18 is a diagram showing the examples of the shape of the hole 9 in the up-and-down direction. FIG. 18 shows, sequentially from above, the holes 9 having a shape parallel to the up-and-down direction, a shape that gradually narrows toward the lower side, a shape that gradually widens toward the lower side, and a shape that gradually widens after gradually narrows toward the lower side.

In the fifth embodiment, when the base portion 1 is vibrated (in particular, the vertical direction), air in the space surrounded by the base portion 1 and the frame 4 exits from the plurality of holes 9 of the base portion 1 to the upper side of the base portion 1. Thus, noise to be generated when the air in the space surrounded by the base portion 1 and the frame 4 compresses and expands in this space is reduced.

Further, in the fifth embodiment, when the base portion 1 is vibrated (in particular, the vertical direction), air in the upper space of the base portion 1 exits from the plurality of holes 9 of the base portion 1 to the lower side of the base portion 1. Thus, noise to be generated due to the vibration of the base portion 1 propagated in the upper space of the base portion 1 when the base portion 1 is vibrated is reduced.

Further, in the fifth embodiment, the plurality of holes 9 is provided at least in the peripheral region in the horizontal direction. Thus, the peripheral region of the base portion 1 is lightened, and the base portion 1 is easily rotated. In other words, in the form of the base portion 1 that is rotated by the vibrating portion 2 about the vertical or horizontal axis (first embodiment and third embodiment), if the plurality of holes 9 is provided in the peripheral region of the base portion 1, it is possible to not only reduce noise but also easily rotate the base portion 1.

Further, in the fifth embodiment, the noise is less likely to occur even if the intensity of the vibration is increased, which makes it possible to present the vibration having a large intensity to the user.

Here, as described above, the vibration presentation apparatus is an apparatus for giving the user the sense of reality or immersion when vibrated in accordance with videos and sounds. Therefore, if the noise caused by the vibration is large, the noise may interfere with the sound that should be originally provided, and the sense of reality or immersion of the user may be reduced.

On the other hand, in the fifth embodiment, since noise generated due to vibration can be reduced, sound to be originally provided can be provided to the user in a clear manner, and the sense of reality or immersion can be appropriately given to the user.

Various Modifications of Fifth Embodiment

Hereafter, various modifications of the structure for reducing the noise due to vibration of the base portion 1 will be described.

"Wire Mesh Structure"

Figure 19:
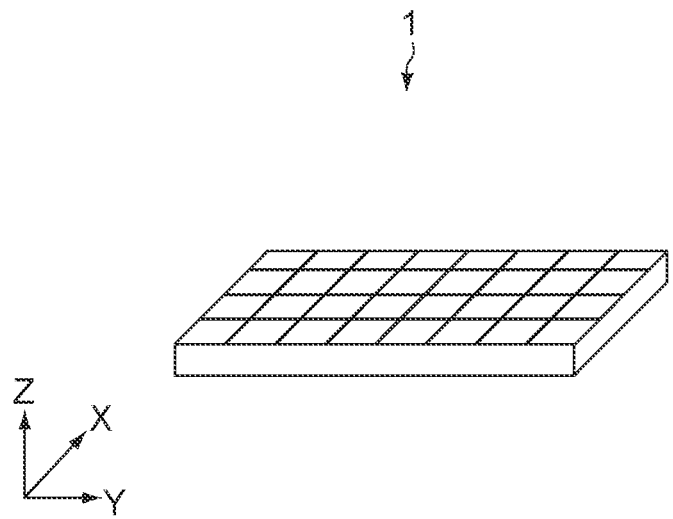
FIG. 19 is a diagram showing an example of a case where the base portion has a wire mesh structure.

FIG. 19 is a diagram showing an example of a case where the base portion 1 has a wire mesh structure. In the example shown in FIG. 19, the entire base portion 1 has a wire mesh structure. On the other hand, the peripheral portion excluding the vicinity of the center of the base portion 1 in the horizontal direction may have a wire mesh structure. Further, FIG. 19 shows an example in which the mesh has a rectangular shape. On the other hand, the shape of the mesh may be a honeycomb shape or the like, and the shape of the mesh is not particularly limited.

Even when the base portion 1 has the wire mesh structure, air can pass therethrough in the up-and-down direction, and thus noise caused by vibration of the base portion 1 can be reduced. Further, in the form in which the base portion 1 is rotated, an effect to easily rotate the base portion 1 is also provided in addition to the soundproofing effect.

"Open-Cell Structure"

Figure 20:
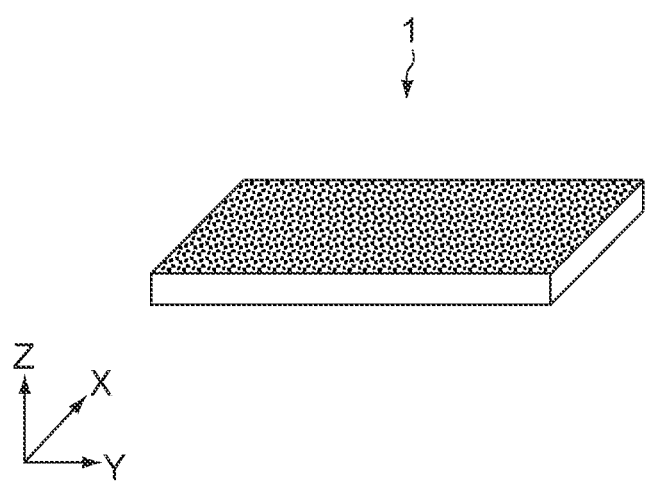
FIG. 20 is a diagram showing an example of a case where the base portion has an open-cell structure.

FIG. 20 is a diagram showing an example in which the base portion 1 has an open-cell structure. In the example shown in FIG. 20, the base portion 1 is formed of a material having the open-cell structure, such as a relatively hard foam rubber or foam plastic having a rigidity that allows a user to ride thereon. In the example shown in FIG. 20, the entire base portion 1 has an open-cell structure, but the peripheral portion excluding the vicinity of the center of the base portion 1 in the horizontal direction may have the open-cell structure.

Even when the base portion 1 has the open-cell structure, air can pass therethrough in the up-and-down direction, and thus noise caused by vibration of the base portion 1 can be reduced. Further, in the form in which the base portion 1 is rotated, an effect to easily rotate the base portion 1 is also provided in addition to the soundproofing effect.

Note that a part of the base portion 1 may be formed of a material (e.g., sponge) having the open-cell structure, such as a relatively soft foam rubber or foam plastic having a rigidity for which the user cannot ride thereon when the material is used alone. In this case, the lower portion of the base portion 1 is made of a material having a rigidity equal to or larger than a certain level (where the structure of the hole 9 or the like may be provided or not), and the upper portion of the base portion 1 is made of a relatively soft material (e.g., sponge) having the open-cell structure.

The relatively soft portion of the open-cell structure is made thicker than the vertical amplitude of the base portion 1, for example. When the base portion 1 vibrates, the vibration of the air above the base portion 1 is absorbed by the relatively soft portion of the open-cell structure, and thus it is possible to prevent the noise from being generated.

Note that the porous structure, the wire mesh structure, and the open-cell structure for allowing air to pass therethrough in the up-and-down direction can be appropriately combined.

Sixth Embodiment

Figure 21:
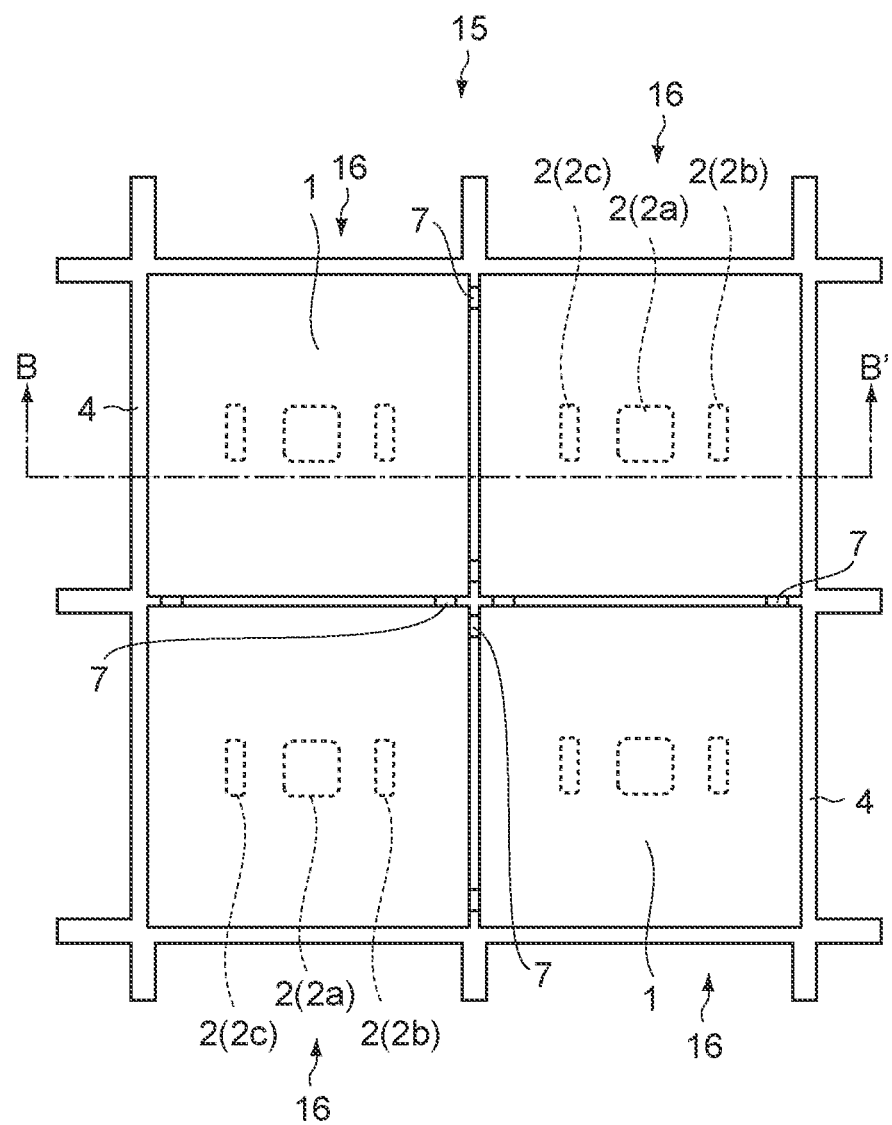
FIG. 21 is a view of a vibration presentation apparatus according to a sixth embodiment as viewed from above.
Figure 22:
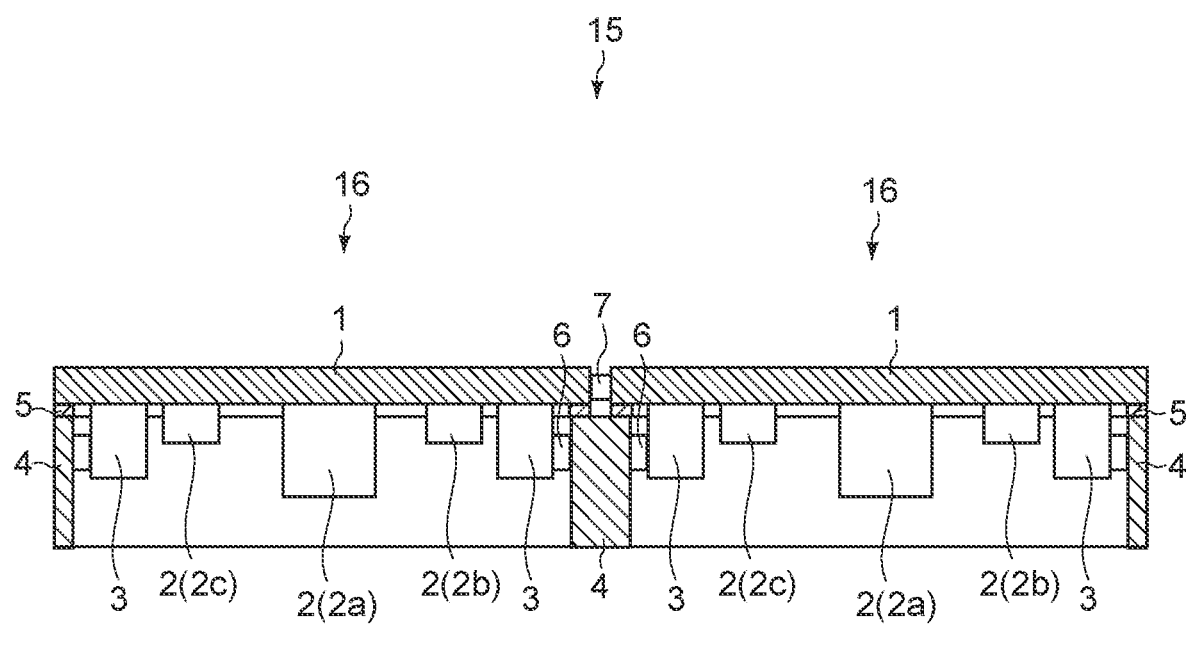
FIG. 22 is a cross-sectional view of the vibration presentation apparatus taken along B-B' shown in FIG. 21 as viewed from a lateral direction.
Figure 22:
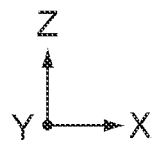

Next, a sixth embodiment of the present technology will be described. FIG. 21 is a view of a vibration presentation apparatus 15 according to the sixth embodiment as viewed from above. FIG. 22 is a cross-sectional view of the vibration presentation apparatus 15 taken along B-B' shown in FIG. 21 as viewed from a lateral direction.

As shown in those figures, the vibration presentation apparatus 15 according to the sixth embodiment includes a plurality of vibrating units 16 disposed adjacent to each other in the horizontal direction. One vibrating unit 16 corresponds to the vibration presentation apparatus described in each of the above embodiments. In the example shown in FIGS. 21 and 22, the number of vibrating units 16 is four, but the number of vibrating units 16 is not particularly limited as long as it is two or more.

In the example shown in FIGS. 21 and 22, the configuration of the vibrating unit 16 (the configuration of the vibrating portion 2) is the same configuration as the vibration presentation apparatus 10 of the first embodiment. On the other hand, the configuration of the vibrating unit 16 (the configuration of the vibrating portion 2) may be configured to correspond to any vibration presentation apparatus among the vibration presentation apparatuses described in the embodiments described above.

Each vibrating unit 16 includes a base portion 1, three vibrating portions 2, four locking members 3, a frame 4, a first buffer portion 5, and eight second buffer portions 6.

The vibration presentation apparatus 15 further includes third buffer portions 7 disposed between two opposing side surfaces of the base portions 1 of the vibrating units 16 adjacent to each other. The third buffer portion 7 is constituted by a member having a certain elastic force, such as rubber or gel (e.g., alpha gel).

In the example shown in FIGS. 21 and 22, in the vibration presentation apparatus 15, two side surfaces of the base portion 1 are opposed to other base portions at four positions, and two third buffer portions 7 are provided for each of the four positions. Therefore, a total of eight (4×2) third buffer portions 7 are provided. Note that the number of third buffer portions 7 can be appropriately changed.

In the sixth embodiment, since the third buffer portions 7 are provided, it is possible to prevent the base portions 1 adjacent to each other from colliding with each other and noise from being generated. Note that as in the first embodiment, in the form in which the base portion 1 is rotated about the vertical axis and vibrated, the base portions 1 adjacent to each other are likely to collide with each other to generate noise, and thus it is particularly effective to provide the third buffer portions 7 in such a form.

Various Modifications

In the above description, the case where the first vibration direction of the first vibrating portion 2a is the vertical direction has been described. On the other hand, the first vibration direction of the first vibrating portion 2a may be a direction in the horizontal plane. Further, in the above description, the case where the vibration presentation apparatus includes three vibrating portions 2 (other than the fourth embodiment) has been described. On the other hand, typically, the vibration presentation apparatus only needs to include at least two vibrating portions 2 (first vibrating portion 2a and second vibrating portion 2b) having different vibration characteristics.

The present technology can have the following configurations.

(1) A vibration presentation apparatus, including:
a base portion on which a user can ride;
a first vibrating portion that is provided to the base portion and has a first vibration characteristic; and
a second vibrating portion that is provided to the base portion and has a second vibration characteristic different from the first vibration characteristic.

(2) The vibration presentation apparatus according to (1), in which
a first vibration direction of the first vibrating portion and a second vibration direction of the second vibrating portion are different directions.

(3) The vibration presentation apparatus according to (2), in which
the first vibration direction and the second vibration direction are orthogonal to each other.

(4) The vibration presentation apparatus according to (3), in which
the first vibration direction is a direction vertical to the base portion, and
the second vibration direction is a direction horizontal to the base portion.

(5) The vibration presentation apparatus according to (4), in which
the first vibrating portion is disposed at a position corresponding to the center of gravity of the base portion, and
the second vibrating portion is disposed at a position deviating from the center of gravity of the base portion.

(6) The vibration presentation apparatus according to (5), in which
the second vibration direction is a direction non-parallel to a straight line connecting the center of gravity of the base portion and the second vibrating portion.

(7) The vibration presentation apparatus according to (6), in which
the second vibration direction is a direction orthogonal to the straight line connecting the center of gravity of the base portion and the second vibrating portion.

(8) The vibration presentation apparatus according to (7), further including
a third vibrating portion that has the second vibration characteristic, vibrates in the second vibration direction, and is disposed at a position on an opposite side of the center of gravity of the base portion from the second vibrating portion.

(9) The vibration presentation apparatus according to (8), in which
the second vibrating portion and the third vibrating portion are driven in opposite phases.

(10) The vibration presentation apparatus according to (5), in which
the second vibration direction is a direction parallel to a straight line connecting the center of gravity of the base portion and the second vibrating portion.

(11) The vibration presentation apparatus according to (10), further including
a third vibrating portion that has the second vibration characteristic, vibrates in the second vibration direction, and is disposed at a position on an opposite side of the center of gravity of the base portion from the second vibrating portion.

(12) The vibration presentation apparatus according to (11), in which
the second vibrating portion and the third vibrating portion are driven in the same phase.

(13) The vibration presentation apparatus according to (1), in which
a first vibration direction of the first vibrating portion and a second vibration direction of the second vibrating portion are the same direction.

(14) The vibration presentation apparatus according to (13), in which
the first vibration direction and the second vibration direction are directions vertical to the base portion.

(15) The vibration presentation apparatus according to (14), in which
the first vibrating portion is disposed at a position corresponding to the center of gravity of the base portion, and
the second vibrating portion is disposed at a position deviating from the center of gravity of the base portion.

(16) The vibration presentation apparatus according to (15), further including
a third vibrating portion that has the second vibration characteristic, vibrates in the second vibration direction, and is disposed at a position on an opposite side of the center of gravity of the base portion from the second vibrating portion.

(17) The vibration presentation apparatus according to (16), in which
the second vibrating portion and the third vibrating portion are driven in opposite phases.

(18) The vibration presentation apparatus according to (14), in which
each of the first vibrating portion and the second vibrating portion is disposed at a position corresponding to the center of gravity of the base portion.

(19) The vibration presentation apparatus according to (18), in which
the second vibrating portion and the third vibrating portion are driven in the same phase.

(20) The vibration presentation apparatus according to any one of (1) to (19), in which
the base portion includes at least one of a porous structure, a wire mesh structure, or an open-cell structure.

(21) The vibration presentation apparatus according to any one of (1) to (20), in which the base portion includes a lower surface, and
the vibration presentation apparatus further includes
a locking member provided on the lower surface of the base portion, and
a frame that supports the base portion from below and restricts horizontal movement of the locking member.

(22) The vibration presentation apparatus according to (21), further including:
a first buffer portion provided between the base portion and the frame; and
a second buffer portion provided between the locking member and the frame.

(23) The vibration presentation apparatus according to (22), in which
the vibration presentation apparatus includes a plurality of vibrating units each including the base portion, the first vibrating portion, and the second vibrating portion and disposed adjacent to each other in a horizontal direction, and
the vibration presentation apparatus further include a third buffer portion provided between two side surfaces of the base portions of the vibrating units adjacent to each other, the two side surfaces facing each other.

(24) The vibration presentation apparatus according to any one of (1) to (23), in which
the vibration characteristic is a frequency characteristic.

REFERENCE SIGNS LIST 1 base portion
2 vibrating portion
3 locking member
4 frame
5 first buffer portion
6 second buffer portion
7 third buffer portion
10 to 15 vibration presentation apparatus

The invention claimed is:
1. A vibration presentation apparatus, comprising:
a base portion on which a user rides;
a frame on a surface of the base portion, wherein
the frame supports the base portion, and
the frame is perpendicular to the base portion;
a first buffer portion between the base portion and the frame, wherein the first buffer portion is configured to reduce attenuation of vibration in the base portion;
a locking member that extends in a vertical direction from a lower surface of the base portion, wherein the locking member is fixed at a position corresponding to each of four corners of the base portion;
a first vibrating portion on the surface of the base portion, wherein
the first vibrating portion has a first vibration characteristic, and
the first vibrating portion is at a center of gravity of the base portion;
a second vibrating portion on the surface of the base portion, wherein
the second vibrating portion has a second vibration characteristic different from the first vibration characteristic, and
the second vibrating portion is on a first side of the center of gravity; and
a third vibrating portion on the surface of the base portion, wherein the third vibrating portion has the second vibration characteristic,
the third vibrating portion is on a second side of the center of gravity opposite to the first side of the center of gravity, and
the frame surrounds the first vibrating portion, the second vibrating portion, and the third vibrating portion.

2. The vibration presentation apparatus according to claim 1, wherein a first vibration direction of the first vibrating portion is different from a second vibration direction of the second vibrating portion.

3. The vibration presentation apparatus according to claim 2, wherein the first vibration direction is orthogonal to the second vibration direction.

4. The vibration presentation apparatus according to claim 3, wherein
the first vibration direction is in the vertical direction to the base portion, and
the second vibration direction is in a horizontal direction to the base portion.

5. The vibration presentation apparatus according to claim 4, wherein the second vibration direction is non-parallel to a straight line that connects the center of gravity of the base portion and the second vibrating portion.

6. The vibration presentation apparatus according to claim 5, wherein the second vibration direction is orthogonal to the straight line that connects the center of gravity of the base portion and the second vibrating portion.

7. The vibration presentation apparatus according to claim 6, wherein the third vibrating portion is configured to vibrate in the second vibration direction.

8. The vibration presentation apparatus according to claim 7, wherein the second vibrating portion and the third vibrating portion are configured to be driven in opposite phases.

9. The vibration presentation apparatus according to claim 4, wherein the second vibration direction is parallel to a straight line that connects the center of gravity of the base portion and the second vibrating portion.

10. The vibration presentation apparatus according to claim 9, wherein the third vibrating portion is configured to vibrate in the second vibration direction.

11. The vibration presentation apparatus according to claim 10, wherein the second vibrating portion and the third vibrating portion are configured to be driven in a same phase.

12. The vibration presentation apparatus according to claim 1, wherein a first vibration direction of the first vibrating portion and a second vibration direction of the second vibrating portion are same.

13. The vibration presentation apparatus according to claim 12, wherein the first vibration direction and the second vibration direction are vertical to the base portion.

14. The vibration presentation apparatus according to claim 13, wherein the third vibrating portion is configured to vibrate in the second vibration direction.

15. The vibration presentation apparatus according to claim 14, wherein the second vibrating portion and the third vibrating portion are configured to be driven in opposite phases.

16. The vibration presentation apparatus according to claim 13, wherein
the third vibrating portion is configured to vibrate in the second vibration direction, and the second vibrating portion and the third vibrating portion are configured to be driven in a same phase.

17. The vibration presentation apparatus according to claim 1, wherein the base portion includes at least one of a porous structure, a wire mesh structure, or an open-cell structure.

18. The vibration presentation apparatus according to claim 1, wherein the first buffer portion is formed of one of rubber or gel.

19. The vibration presentation apparatus according to claim 1, wherein the second vibrating portion and the third vibrating portion are configured to:
   generate a rotational movement, in the vertical direction that passes through a position of the center of gravity of the base portion, and
   rotate the base portion based on the generated rotational movement.

20. The vibration presentation apparatus according to claim 1, wherein the locking member is locked by an inner circumferential surface of the frame.

21. The vibration presentation apparatus according to claim 1, further comprising a second buffer portion between an outer circumferential surface of the locking member and an inner circumferential surface of the frame.

\* \* \* \* \*